United States Patent
Shen et al.

(10) Patent No.: US 11,481,969 B2
(45) Date of Patent: *Oct. 25, 2022

(54) SYSTEMS, METHODS, AND COMPUTER-READABLE MEDIA FOR AUTOMATIC COMPUTED TOMOGRAPHY TO COMPUTED TOMOGRAPHY REGISTRATION

(71) Applicant: Covidien LP, Mansfield, MA (US)

(72) Inventors: Jiguang Shen, Minneapolis, MN (US); Lev A. Koyrakh, Plymouth, MN (US); Oren P. Weingarten, Hod-Hasharon (IL); Ron Barak, Tel Aviv (IL)

(73) Assignee: COVIDIEN LP, Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,817

(22) Filed: Apr. 19, 2021

(65) Prior Publication Data

US 2021/0241520 A1 Aug. 5, 2021

Related U.S. Application Data

(63) Continuation of application No. 16/217,413, filed on Dec. 12, 2018, now Pat. No. 10,984,585.

(Continued)

(51) Int. Cl.
*G06T 17/00* (2006.01)
*G06T 7/00* (2017.01)
(Continued)

(52) U.S. Cl.
CPC ............... *G06T 17/00* (2013.01); *G06T 5/20* (2013.01); *G06T 7/0012* (2013.01); *G06T 7/344* (2017.01);
(Continued)

(58) Field of Classification Search
CPC ......... G06T 17/00; G06T 5/20; G06T 7/0012; G06T 2207/10081; G06T 7/344; G06T 7/62; G06T 7/64; G06T 2207/30061
See application file for complete search history.

(56) References Cited

U.S. PATENT DOCUMENTS

| 5,727,554 A | 3/1998 | Kalend et al. |
| 6,076,005 A | 6/2000 | Sontag et al. |

(Continued)

FOREIGN PATENT DOCUMENTS

| JP | 2006512950 A | 4/2006 |
| WO | 2011101754 A1 | 8/2011 |

OTHER PUBLICATIONS

Duvan Alberto Gomez Betancur et al.: "Airway Segmentation, Skeletonization, and Tree Matching to Improve Registration of 3D CT Images with Large Opacities in the Lungs", Sep. 10, 2016, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 395-407, XP047356291.

(Continued)

*Primary Examiner* — David T Welch
(74) *Attorney, Agent, or Firm* — Carter, DeLuca & Farrell LLP

(57) ABSTRACT

Systems, methods, and computer-readable media for registering initial computed tomography (CT) images of a luminal network with subsequent CT images of the luminal network include obtaining initial CT images of the luminal network and subsequent CT images of the luminal network, generating an initial three-dimensional (3D) model of the luminal network based on the initial CT images of the luminal network, generating a subsequent 3D model of the luminal network based on the subsequent CT images of the (Continued)

luminal network, and matching the initial 3D model with the subsequent 3D model based on a registration.

20 Claims, 10 Drawing Sheets

Related U.S. Application Data

(60) Provisional application No. 62/597,985, filed on Dec. 13, 2017.

(51) Int. Cl.
*G06T 5/20* (2006.01)
*G06T 7/33* (2017.01)
*G06T 7/64* (2017.01)
*G06T 7/62* (2017.01)

(52) U.S. Cl.
CPC ............... *G06T 7/62* (2017.01); *G06T 7/64* (2017.01); *G06T 2207/10081* (2013.01); *G06T 2207/30061* (2013.01)

(56) References Cited

U.S. PATENT DOCUMENTS

| | | | |
|---|---|---|---|
| 6,144,875 A | 11/2000 | Schweikard et al. | |
| 6,188,355 B1 | 2/2001 | Gilboa | |
| 6,473,635 B1 | 10/2002 | Rasche | |
| 6,501,981 B1 | 12/2002 | Schweikard et al. | |
| 6,580,938 B1 | 6/2003 | Acker | |
| 6,865,253 B2 | 3/2005 | Blumhofer et al. | |
| 7,123,758 B2 | 10/2006 | Jeung et al. | |
| 7,213,820 B2 | 5/2007 | Drummond | |
| 7,233,280 B2 | 6/2007 | Mor et al. | |
| 7,318,805 B2 | 1/2008 | Schweikard et al. | |
| 7,403,638 B2 | 7/2008 | Jeung et al. | |
| 7,747,055 B1* | 6/2010 | Vining | A61B 8/483 382/130 |
| 7,747,305 B2 | 6/2010 | Dean | |
| 7,853,308 B2 | 12/2010 | Sauer et al. | |
| 8,200,315 B2 | 6/2012 | Mostafavi | |
| 8,233,688 B2 | 7/2012 | Soubelet et al. | |
| 8,295,435 B2 | 10/2012 | Wang et al. | |
| 8,331,532 B2 | 12/2012 | Nord et al. | |
| 8,405,834 B2* | 3/2013 | Srinivasan | A61B 5/0066 356/479 |
| 8,744,045 B2 | 6/2014 | Nord et al. | |
| 10,984,585 B2 | 4/2021 | Shen et al. | |
| 2005/0182295 A1 | 8/2005 | Soper et al. | |
| 2005/0197568 A1 | 9/2005 | Vass et al. | |
| 2007/0047790 A1 | 3/2007 | Dewaele | |
| 2008/0085042 A1 | 4/2008 | Trofimov | |
| 2008/0240536 A1 | 10/2008 | Soubelet et al. | |
| 2009/0161927 A1* | 6/2009 | Mori | A61B 6/466 382/128 |
| 2010/0164950 A1 | 7/2010 | Zhao et al. | |
| 2011/0085720 A1 | 4/2011 | Averbuch | |
| 2011/0093243 A1* | 4/2011 | Tawhai | G06T 7/0012 703/2 |
| 2011/0184238 A1 | 7/2011 | Higgins et al. | |
| 2012/0172712 A1 | 7/2012 | Bar-Tal | |
| 2012/0203065 A1* | 8/2012 | Higgins | G06V 20/647 600/117 |
| 2012/0287238 A1* | 11/2012 | Onishi | A61B 1/0005 348/45 |
| 2012/0288173 A1 | 11/2012 | Rai et al. | |
| 2012/0323247 A1 | 12/2012 | Bettenga | |
| 2014/0270441 A1 | 9/2014 | Baker | |
| 2014/0281961 A1 | 9/2014 | Baker | |
| 2014/0282216 A1 | 9/2014 | Baker | |
| 2016/0000356 A1 | 1/2016 | Brown et al. | |
| 2016/0125604 A1* | 5/2016 | Wang | G06T 7/174 382/128 |
| 2016/0267654 A1 | 9/2016 | Wang | |
| 2016/0374562 A1* | 12/2016 | Vertikov | A61B 5/0095 600/424 |
| 2017/0161456 A1 | 6/2017 | Baker | |
| 2018/0005371 A1 | 1/2018 | Sabina | |
| 2018/0206940 A1 | 7/2018 | Kopelman | |
| 2019/0043269 A1 | 2/2019 | Lin | |
| 2019/0307458 A1* | 10/2019 | Mathis | A61M 16/00 |
| 2019/0355183 A1 | 11/2019 | Xie | |
| 2020/0046431 A1 | 2/2020 | Soper | |

OTHER PUBLICATIONS

Arnaud Charnoz et al: "Liver Registration for the Follow-Up of Hepatic Tumors", Oct. 26, 2005, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 155-162, XP047461354.

Arnaud Charnoz et al: "Design of Robust Vascular Tree Matching: Validation on Liver", Jul. 10, 2005, Information Processing in Medical Imaging; [Lecture Notes in Computer Science; [LNICS], Springer-Verlag, Berlin/Heidelberg, pp. 443-455, XP019011609.

Supplementary extended European Search Report issued in corresponding application, EP 18888495.1 dated Sep. 13, 2021 (10 pages).

Qin, Wenyu, et al. "An automatic multi-sample 3d face registration method based on thin plate spline and deformable model." 2012 IEEE InternationalConference on Multimedia and Expo Workshops. IEEE, 2012. (Year: 2012).

Alfredo Morales Pinzon et al., "A tree-matching algorithm: Application to airways in CT images of subjects with the acute respiratory distress syndrome", Medical Image Analysis, Jan. 2017, pp. 101-115.

International Search Report and Written Opinion for application No. PCT/US2018/065360 dated Apr. 9, 2019.

\* cited by examiner

EXAMPLE OF TRANSFORMED POLYLINES

SYSTEMS, METHODS, AND COMPUTER-READABLE MEDIA FOR AUTOMATIC COMPUTED TOMOGRAPHY TO COMPUTED TOMOGRAPHY REGISTRATION

CROSS REFERENCE TO RELATED APPLICATION

This application is a continuation of U.S. patent application Ser. No. 16/217,413, filed on Dec. 12, 2018, which claims the benefit of the filing date of provisional U.S. Patent Application No. 62/597,985, filed on Dec. 13, 2017.

FIELD

The present disclosure relates to bronchial registration and, more particularly, to devices, systems, methods, and computer-readable media for automatically registering an initial three-dimensional (3D) volumetric model of a patient's airways generated from initial computed tomography (CT) images with a subsequent 3D volumetric model of the patient's airways generated from subsequent CT images.

BACKGROUND

A common device for inspecting the airway of a patient is a bronchoscope. Typically, the bronchoscope is inserted into a patient's airways through the patient's nose or mouth and can extend into the lungs of the patient. A typical bronchoscope includes an elongated flexible tube having an illumination assembly for illuminating the region distal to the bronchoscope's tip, an imaging assembly for providing a video image from the bronchoscope's tip, and a working channel through which instruments, e.g., diagnostic instruments such as biopsy tools, therapeutic instruments can be inserted.

Bronchoscopes, however, are limited in how far they may be advanced through the airways due to their size. Where the bronchoscope is too large to reach a target location deep in the lungs, a clinician may utilize certain real-time imaging modalities such as computed tomography or fluoroscopy. CT and fluoroscopic images, while useful, present certain drawbacks for navigation as it is often difficult to distinguish luminal passageways from solid tissue. Moreover, the images generated are two-dimensional whereas navigating the airways of a patient requires the ability to maneuver in three dimensions.

Systems have been developed that enable the development of 3D models of the airways or other luminal networks, typically from a series of computed tomography (CT) images. One such system has been developed as part of the ILOGIC® ELECTROMAGNETIC NAVIGATION BRONCHOSCOPY® (ENB™), system currently sold by Medtronic PLC. The details of such a system are described in commonly assigned U.S. Pat. No. 7,233,820, entitled ENDOSCOPE STRUCTURES AND TECHNIQUES FOR NAVIGATING TO A TARGET IN BRANCHED STRUCTURE, filed on Mar. 29, 2004, by Gilboa, the entire contents of which are incorporated herein by reference.

During the ENB procedures it is important to register the magnetic navigation information to the patient's CT scan. As understood in the art, "registration" refers to a translation, mapping, transformation, or the like, which converts locations or coordinates in one space to locations or coordinates in another space. In order to perform such registration, several methods have been developed. One method, known as manual registration, is based on the visual identification with the bronchoscope of the main airways branching points and associating them with the points visually identified on the CT scans. During the procedure the user navigates the bronchoscope with catheter fitted with the magnetic sensing coil to the branching points in the airways and manually creates the associations between the branching points and the locations in the magnetic navigation space. Another method, known as automatic registration, is based on collection of the point cloud from the airways (called survey) using a catheter with the magnetic sensor at its tip, and then fitting the survey to the image of the airway tree derived from the CT scan using a segmentation algorithm. While registration of the magnetic navigation information to the patient's CT scan is useful, there always exists a need to improve the accuracy of registration.

SUMMARY

Provided in accordance with the present disclosure are systems, methods, and computer-readable media for the registering an initial 3D volumetric model of a patient's airways generated from initial CT images with a subsequent 3D volumetric model of the patient's airways generated from subsequent CT images. The disclosed technology can be used for comparing points of interest between consecutive CT images during patient follow-ups, and can be used for transferring a planned pathway in the initial CT images to the subsequent CT images.

The present disclosure provides registration accuracy by incorporating the flexibility of the lungs into the registration via the techniques described herein. Due to the flexibility of the lungs, the actual shape of the lungs during the time of a surgical procedure can be different from that at the time of the initial CT scan, resulting in the reduction of the navigation accuracy. Thus, the present disclosure includes devices, systems, methods, and computer-readable media to perform CT-to-CT registration, before or during the ENB procedure, particularly as it relates at or around a navigation target.

In an aspect of the present disclosure, a method of registering initial computed tomography (CT) images of a luminal network with subsequent CT images of the luminal network is provided. The method includes obtaining initial CT images of the luminal network and subsequent CT images of the luminal network, generating an initial three-dimensional (3D) model of the luminal network based on the initial CT images of the luminal network, generating a subsequent 3D model of the luminal network based on the subsequent CT images of the luminal network, matching the initial 3D model with the subsequent 3D model based on a registration, and performing geometric filtering and/or topological filtering on the matching of the initial 3D model with the subsequent 3D. In another aspect of the present disclosure, the luminal network is an airway of a patient and the 3D model is a model of the airway of the patient.

In a further aspect of the present disclosure, matching the initial 3D model with the subsequent 3D model based on a registration includes: selecting a plurality of initial reference points within the initial 3D model, and selecting a plurality of reference points within the subsequent 3D model, wherein the plurality of initial reference points and the plurality of reference points include x, y, and z coordinates. In yet another aspect of the present disclosure, the registration is a rigid registration of the initial 3D model with the subsequent 3D model, and the rigid registration includes determining an alignment between the initial 3D model and the subsequent 3D model minimizing a divergence between the plurality of initial reference points and the plurality of reference points.

In another embodiment of the present disclosure, the registration is a multi-rigid registration of the initial 3D model to the subsequent 3D model. In yet another embodiment, the registration includes a thin plate splines transformation from the initial 3D model to the subsequent 3D model, where deriving the thin plate splines transformation includes selecting fiducial points within the plurality of initial reference points and fiducial points within the plurality of reference points, matching the fiducial points within the plurality of reference points with the fiducial points within the plurality of initial reference points to generate point pairs, generating a plurality of additional point pairs based on the multi-rigid transformation, and deriving the thin plate splines transformation based on the plurality of point pairs and the additional point pairs.

In another aspect of the present disclosure, performing geometric filtering on the matching of the initial 3D model with the subsequent 3D model further includes applying a piecewise derivative overlapping filter, a curve similarity filter, a length similarity filter, and/or an angle similarity filter on the matching of the initial 3D model with the subsequent 3D model, and unmatching, based on the piecewise derivative overlapping filter, the curve similarity filter, the length similarity filter, or the angle similarity filter portions of the initial 3D model and of the subsequent 3D model that were matched in the matching.

In a further aspect of the present disclosure, performing topological filtering on the matching of the initial 3D model with the subsequent 3D model further includes applying a local displacement consistency filter, a patch transformation consistency filter, and/or an isomorphism scoring system on the matching of the initial 3D model with the subsequent 3D model, and unmatching, based on the local displacement consistency filter, the patch transformation consistency filter, or the isomorphism scoring system, portions of the initial 3D model and of the subsequent 3D model that were matched in the matching.

In a further aspect of the present disclosure, the method includes deriving a thin plate splines transformation from the initial 3D model to the subsequent 3D model based on portions of the initial 3D model and the subsequent 3D model that were matched by the matching and that remain matched after the geometric filtering or the topological filtering.

In another aspect of the present disclosure, a system for registering initial computed tomography (CT) images of a luminal network with subsequent CT images of the luminal network is disclosed. The system includes a computing device including a processor and a memory, and an application stored in the memory. The application when executed, causes the computing device to obtain initial CT images of the luminal network and subsequent CT images of the luminal network, generate an initial three-dimensional (3D) model of the luminal network based on the initial CT images of the luminal network, generate a subsequent 3D model of the luminal network based on the subsequent CT images of the luminal network, match the initial 3D model with the subsequent 3D model based on a registration, and perform geometric filtering and/or topological filtering on the match of the initial 3D model with the subsequent 3D model. In another aspect of the present disclosure, the luminal network is an airway of a patient and the 3D model is a model of the airway of the patient.

In a further aspect of the present disclosure, in matching the initial 3D model with the subsequent 3D model based on a registration, the application when executed further causes the computing device to select initial reference points within the initial 3D model and select reference points within the subsequent 3D model, where the initial reference points and the reference points include x, y, and z coordinates. In yet another aspect of the present disclosure, the registration by the system is a rigid registration of the initial 3D model to the subsequent 3D model, which includes the aspects described above. In another embodiment of the present disclosure, the registration used by the system is a multi-rigid registration of the initial 3D model to the subsequent 3D model. In yet another embodiment, the registration used by the system includes a thin plate splines transformation from the initial 3D model to the subsequent 3D model, where deriving the thin plate splines transformation includes the aspects described above.

In another aspect of the present disclosure, in performing geometric filtering on the matching of the initial 3D model with the subsequent 3D model, the application when executed further causes the computing device to applying a piecewise derivative overlapping filter, a curve similarity filter, a length similarity filter, and/or an angle similarity filter on the matching of the initial 3D model with the subsequent 3D model, and unmatching, based on the piecewise derivative overlapping filter, the curve similarity filter, the length similarity filter, or the angle similarity filter, portions of the initial 3D model and of the subsequent 3D model that were matched in the matching.

In a further aspect of the present disclosure, in performing topological filtering on the matching of the initial 3D model with the subsequent 3D model, the application when executed further causes the computing device to apply a local displacement consistency filter, a patch transformation consistency filter, and/or an isomorphism scoring system on the matching of the initial 3D model with the subsequent 3D model, and unmatching, based on the local displacement consistency filter, the patch transformation consistency filter, or the isomorphism scoring system, portions of the initial 3D model and of the subsequent 3D model that were matched in the matching.

In a further aspect of the present disclosure, the application when executed further causes the computing device to derive a thin plate splines transformation from the initial 3D model to the subsequent 3D model based on portions of the initial 3D model and the subsequent 3D model that were matched by the matching and that remain matched after the geometric filtering or the topological filtering.

In a further aspect, a system for registering initial computed tomography (CT) images of a luminal network with subsequent CT images of the luminal network includes a computing device including a processor and a memory, and an application stored in the memory and executed by the processor. The application, when executed, causes the computing device to obtain initial CT images of the luminal network and subsequent CT images of the luminal network, generate an initial three-dimensional (3D) model of the luminal network based on the initial CT images of the luminal network, generate a subsequent 3D model of the luminal network based on the subsequent CT images of the luminal network, match the initial 3D model with the subsequent 3D model based on a registration, and unmatching portions of the initial 3D model and of the subsequent 3D model that do not satisfy a matching threshold, and register the initial 3D model with the subsequent 3D model based on portions of the initial 3D model and of the subsequent 3D model that remain matched after the unmatching.

In a further aspect, a system for registering initial computed tomography (CT) images of a luminal network with subsequent CT images of the luminal network includes a computing device including a processor and a memory, and an application stored in the memory and executed by the processor. The application, when executed, causes the computing device to obtain initial CT images of the luminal network and subsequent CT images of the luminal network, generate an initial three-dimensional (3D) model of the luminal network based on the initial CT images of the luminal network, generate a subsequent 3D model of the luminal network based on the subsequent CT images of the luminal network, match the initial 3D model with the subsequent 3D model based on a registration, and derive a thin plate splines transformation from the initial 3D model to the subsequent 3D model based on the matching of the initial 3D model with the subsequent 3D model.

Any of the above aspects and embodiments of the present disclosure may be combined without departing from the scope of the present disclosure.

BRIEF DESCRIPTION OF THE DRAWINGS

Objects and features of the presently disclosed system and method will become apparent to those of ordinary skill in the art when descriptions of various embodiments thereof are read with reference to the accompanying drawings, wherein.

DETAILED DESCRIPTION

Due to the flexibility of the lungs, the actual shape of the lungs during a procedure can be very different than at the instance of the recording of any pre-operative images. This change in shape, caused for example by breathing during the surgical procedure can result in reduced accuracy during navigation. The present disclosure is directed to addressing these issues and using devices, systems, methods, and computer-readable media for registering a 3D bronchial tree model (hereinafter referred to as a "3D model") of a patient's airways based on initial CT images with a 3D model based on subsequent CT images. The disclosed technology can be used for comparing points of interest between consecutive CT images during patient follow-ups, and can be used for transferring a planned pathway in the initial CT images to the subsequent CT images. "Registration" refers to a translation, mapping, transformation, or the like, which converts locations or coordinates in one space to locations or coordinates in another space. The present disclosure provides registration accuracy by incorporating the flexibility of the lungs into the registration via the use of rigid registration, multi-rigid registration and/or interpolation techniques, such as the Thin Plate Splines (TPS) Transformation, together with geometric and/or topological filtering.

In one example of the application of the present disclosure, a pre-operative CT scan is used for pre-procedure planning and determination of a pathway plan. While this plan and the pathway generated from the CT data is representative of the patient's lungs, because the patient's lungs are dynamic organs, their exact locations within the patient and the relative locations of the airways can move significantly between the time the initial CT scan is undertaken and an actual procedure. As such the ability to register locations in these airways to the pathway plan generated from CT data is very useful in enhancing the accuracy of navigation to a desired location within the lungs and promotes better treatment outcomes. Additionally, when updated CT scans are performed after a pathway plan is generated based on an initial CT scan, it is helpful to computationally transfer the pathway plan to the updated CT scan rather than manually doing so. Accordingly, in one aspect, the present disclosure relates to registering a 3D model generated based on an initial CT scan with a 3D model generated based on a subsequent CT scan.

Figure 1:
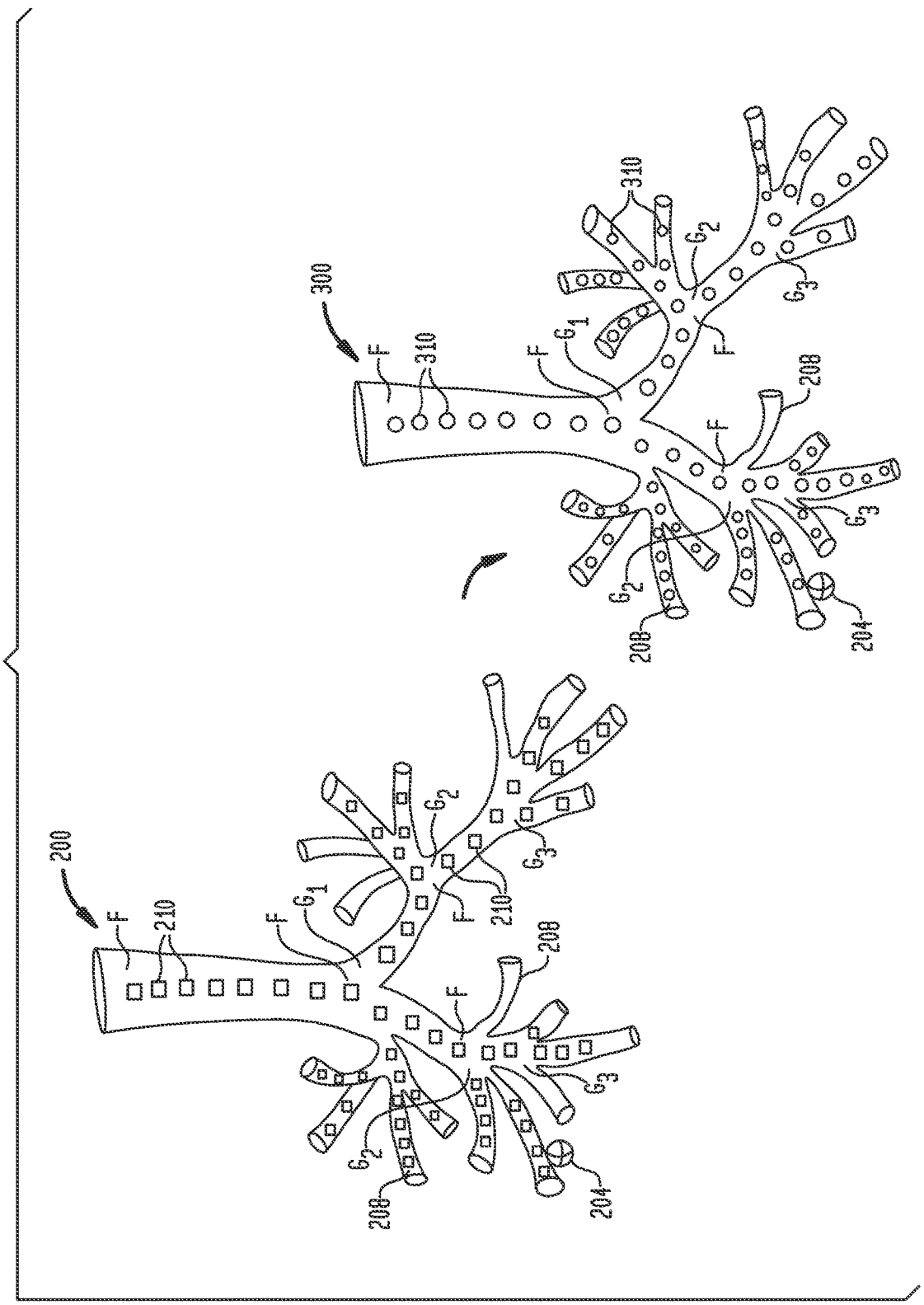
FIG. 1 are views of an initial 3D model of a luminal network based on initial CT images of a patient and a subsequent 3D model of the luminal network based on subsequent CT images of the patient, provided in accordance with an embodiment of the present disclosure.

FIG. 1 illustrates two 3D models a patient's airways created based on CT images. As shown in FIG. 1, both initial 3D model 200 and subsequent 3D model 300 detail one or more targets 204 and airway branches 208 originating from generation bifurcations "$G_1$"-"$G_3$" and are based on initial and subsequent CT images of the patient's airways, respectively. Generation bifurcations "$G_1$"-"$G_3$" are locations within 3D model 200, 300 where one airway branch 208 breaks into two or more smaller airways. Although, 3D models 200, 300 only illustrate airway branches 208 up to the third generation bifurcation, it is understood that in practice, 3D models 200, 300 may have up to 23 generations.

Figure 6:
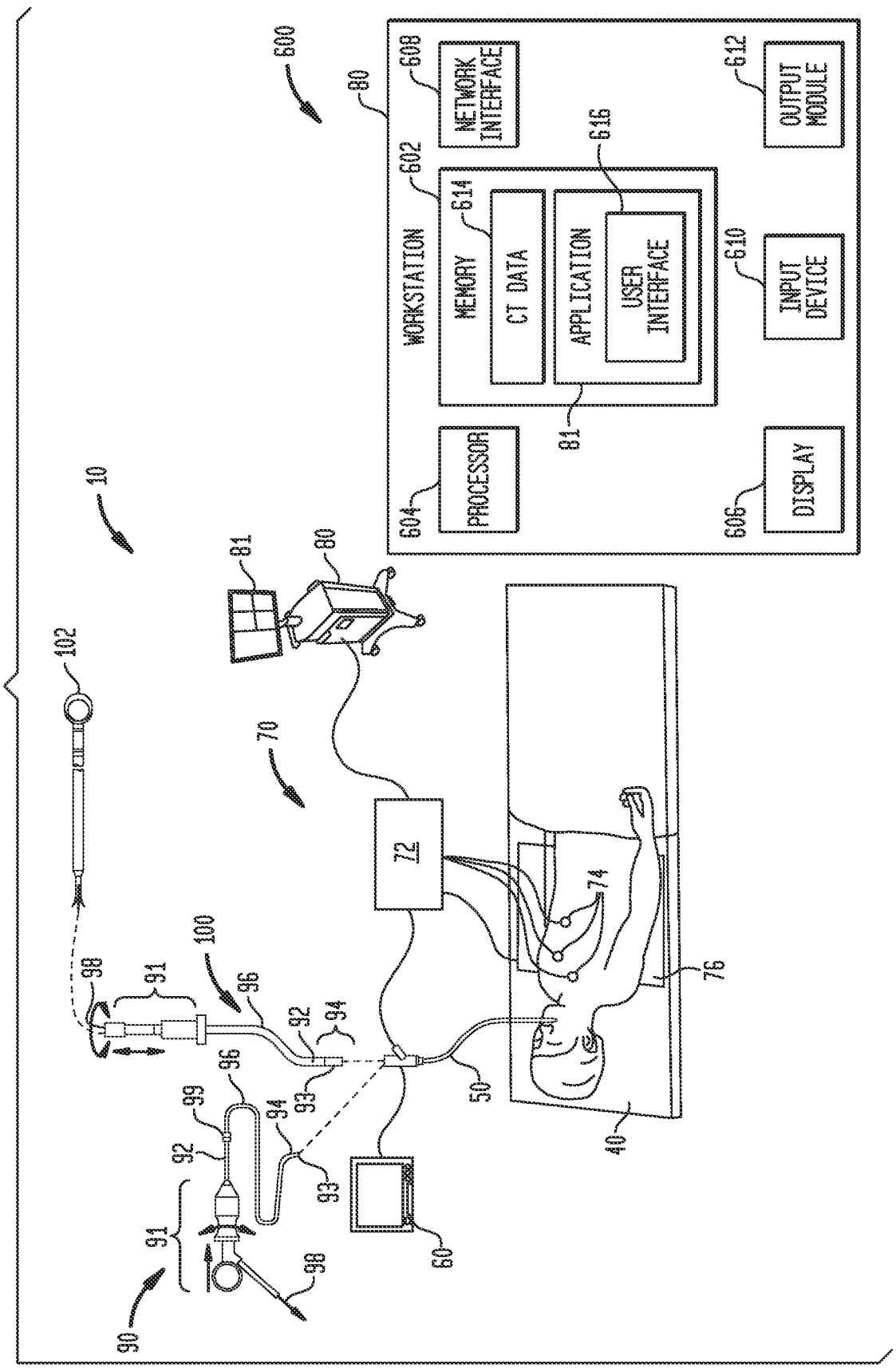
FIG. 6 is a perspective view of an electromagnetic navigation system and a schematic diagram of a workstation, provided in accordance with an embodiment of the present disclosure.

Included within airway tree and airway branches 208 of initial 3D model 200 are plurality of reference points 210. Some of the reference points are also fiducial points labeled "F." Fiducial points "F" are selected reference points 210, which are located at intersections in the airways where the airway branches branch apart. The reference points 210 are selected at locations within the center of the airways of initial 3D model 200, and each has x, y, and z coordinates associated with it which are recorded and stored in memory 602 (FIG. 6). In one example the reference points are selected at predetermined distance intervals throughout initial 3D model 200. In proximity to one or more targets 204 the predetermined distance intervals may be decreased thus increasing the number of reference points 210. Once all plurality of reference points 210 are selected, an initial airway tree 250, illustrated in FIG. 2, may be generated. Using the locations of plurality of reference points 210, processor 604 (FIG. 6) may generate initial 3D model 200 based on plurality of initial reference points 210. Although Cartesian coordinates are used in the present disclosure for simplicity, it is contemplated that a different coordinate system can be used, such as spherical coordinates, cylindrical coordinates, or other coordinate systems. Such other coordinate systems are contemplated to be within the scope of the present disclosure.

Subsequent 3D model 300 includes plurality of reference points 310 and fiducial points "F" which are included within airway tree and airway branches 308. Plurality of reference points 310 are selected at location within the center of the airways of 3D model 300, and each has x, y, and z coordinates which are recorded and stored in memory 602 (FIG. 6), and are selected at predetermined distance intervals throughout subsequent 3D model 300. In closer proximity to one or more targets 304 the predetermined distance intervals may be decreased thus increasing the number of plurality of reference points 310. Once all plurality of reference points 310 are selected, subsequent airway tree 350, illustrated in FIG. 2, may be generated. Although subsequent 3D model 300 is shown as a full 3D model of the patient's airways, if subsequent CT images are obtained via a CBCT scan, subsequent 3D model 300 can be generated as a partial 3D model of the patient's airways.

Figure 2:
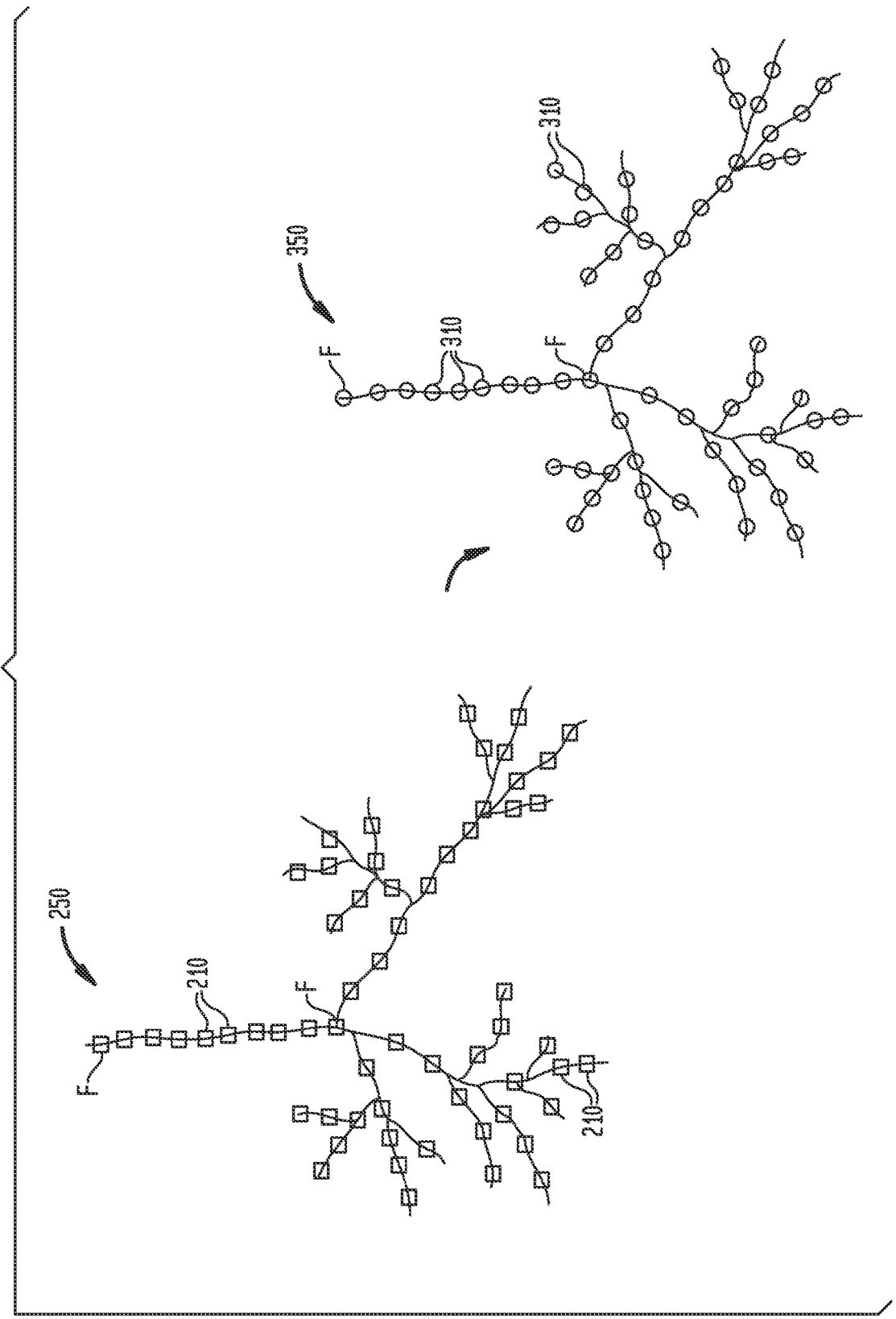
FIG. 2 are views of an initial airway tree and a subsequent airway tree, provided in accordance with an embodiment of the present disclosure.

FIG. 2 is an illustration of initial airway tree 250 and subsequent airway tree 350, which are used in various types of registration, including rigid registration, multi-rigid registration and/or the TPS Transform described below herein. Initial airway tree 250 and subsequent airway tree 350 are illustrated as a plurality of connected nodes in the shape of a luminal network. Centerlines within the airways from initial 3D model 200 and subsequent 3D model 300 are used to generate each of airway trees 250, 350. As illustrated in FIG. 2, initial airway tree 250 includes plurality of initial reference points 210 and subsequent airway tree 350 includes plurality of reference points 310. The plurality of initial reference points 210 are obtained from initial 3D model 200, shown in FIG. 1, and the plurality of reference points 310 are obtained from subsequent 3D model 300, also shown in FIG. 1. Various techniques for registering the CT space of the initial 3D model 200 to the CT space of the subsequent 3D model 300 will now be described, including rigid registration, multi-rigid registration, TPS Transformation, geometric filtering, and/or topological filtering.

During rigid registration, the goal is to find the alignment between initial airway tree 250 and subsequent airway tree 350 which results in minimal "divergence" between local airways, as explained by the following. The rigid registration essentially corrects the global displacement between the initial airway tree 250 and the subsequent airway tree 350. In rigid registration, the minimum distance from each initial reference point 210 to a prospective transformation of subsequent airway tree 350 is determined. In the case of rigid registration, the "divergence" can be an average of the minimum distances. (Divergence in the case of multi-rigid registration will be described below herein.) In rigid registration, the divergence metrics for prospective transformations are compared, and the transformation corresponding to the minimum divergence is selected as the transformation to use for the rigid registration. That is, the transformation enables conversion of locations in the initial 3D model 200 to locations or coordinates in the subsequent 3D model 300. By applying the "Automatic Registration" technique, described in commonly owned U.S. Patent Application Publication No. 2011/0085720, entitled "AUTOMATIC REGISTRATION TECHNIQUE," filed on May 14, 2010, by Averbuch et al., the entire contents of all of which are incorporated herein by reference, and using plurality of points from the initial CT volume as initial reference points 210 of initial airway tree 250 and the plurality of points from the subsequent CT volume as reference points 310 of the subsequent airway tree 350, initial airway tree 250 can be registered to subsequent airway tree 350, and the rigid registration between airway trees 250, 350 can be determined. Thus, the Automatic Registration technique can be used to determine the registration not only between electromagnetic navigation survey points and a volumetric model of segmented airways from a CT scan, but between two volumetric models based on CT scans. For example, the transformation used in rigid registration may involve a slight rotation of initial airway tree 250, such that locations in initial airway tree 250 are converted to locations in subsequent airway tree 350 based on the rotation. The particular manner of determining divergence disclosed above is exemplary. Generally, divergence as used herein refers to a metric that quantifies degrees to which a survey airway tree is aligned or not aligned with a reference airway tree. Other ways of determining divergence are contemplated to be within the scope of the present disclosure.

Another registration technique is multi-rigid registration. As used herein, multi-rigid registration refers to a collection of optimized region registrations. As explained below, optimized region registration seeks to align a particular region of the subsequent airway tree 350 as closely as possible with the corresponding region of the initial airway tree 250, while taking into account to a lesser extent the overall alignment of other regions of the airway trees. Optimized region registration is performed for each region of the airway trees, and this entire process is referred to as multi-rigid registration. Multi-rigid registration is described below in connection with FIG. 7 and is also described in co-pending U.S. Provisional Application No. 62/594,623, the entire contents of which are hereby incorporated herein by reference.

Figure 7:
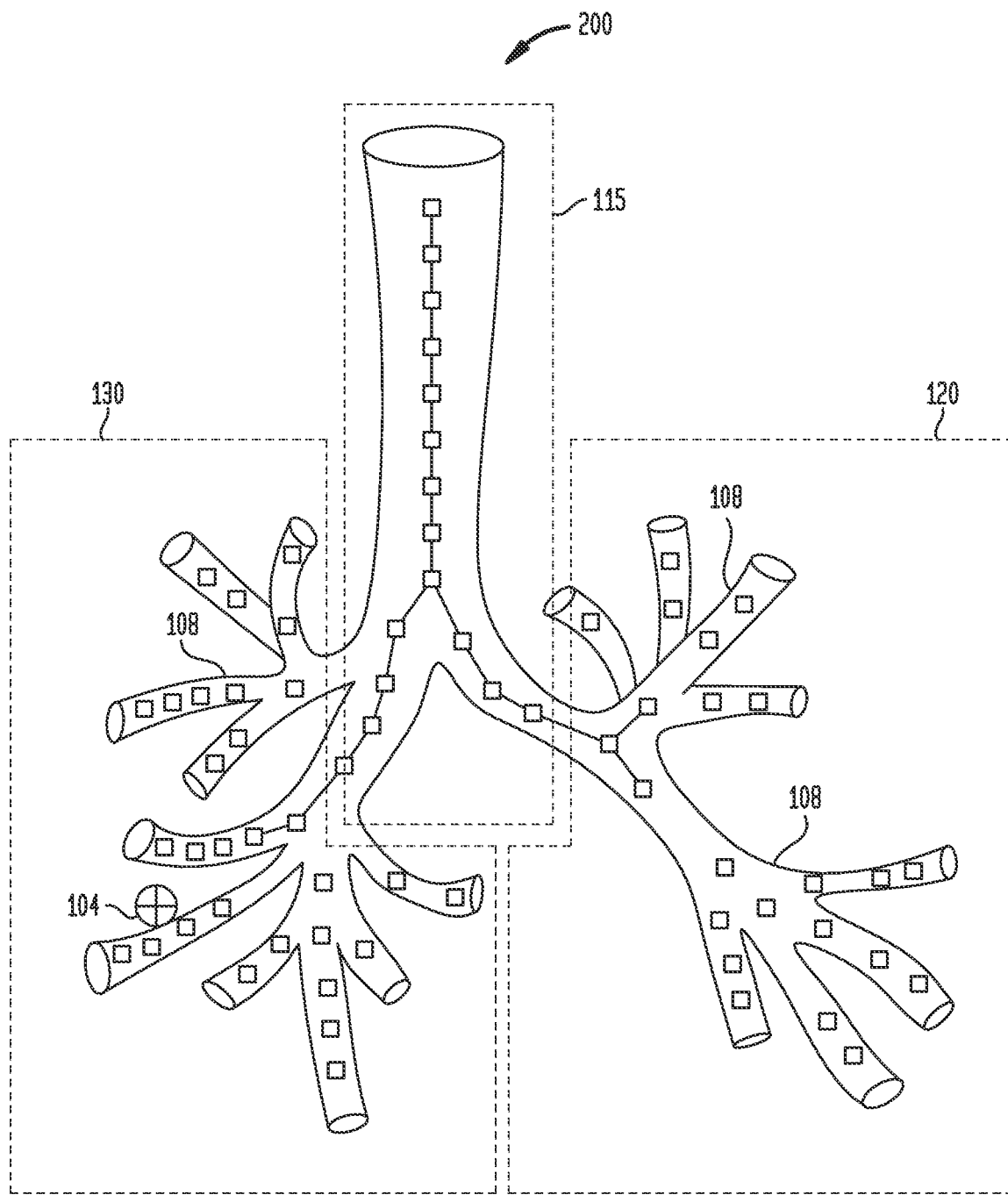
FIG. 7 is a view of a 3D model of a luminal network with designated regions, provided in accordance with an embodiment of the present disclosure.

Referring now to FIG. 7, there is shown, in connection with multi-rigid registration, an illustration of 3D model 200 of a patient's airways generated based on a computed tomographic (CT) scan. As shown in FIG. 7, 3D model 200 includes an airway tree, target 104, and airway branches 108. 3D model 200 is divided into a plurality of regions. Central region 115 includes the trachea and surrounding airways, left lung region 120 includes the airways of the left lung, and right lung region 130 includes the airways of right lung. In multi-rigid registration, each of the plurality of regions is associated with a separate registration. For example, in one embodiment, central region 115, left lung region 120, and right lung region 130 each will have a separate registration. The number of regions and the location and arrangement of regions is exemplary, and other numbers, locations, and arrangement of regions are contemplated to be within the scope of the present disclosure. For example, a particular arrangement of regions can include a region for a target lobe region, a region for the other lobe, and transition regions to the lobes. Other arrangements are contemplated.

With reference also to FIG. 2, and as used herein, multi-rigid registration refers to a collection of optimized region registrations. As explained below, optimized region registration seeks to align a particular region of a subsequent airway tree 350 as closely as possible with the corresponding region of the initial airway tree 250, while taking into account to a lesser extent the overall alignment of other regions of the airway trees. Optimized region registration is performed for each region of the airway trees, and this entire process is referred to as multi-rigid registration.

During multi-rigid registration and optimized region registration, as further described herein, it is contemplated that each of the regions will have weight assigned, which is used to determine the amount that each region of subsequent airway tree 350 is able to be aligned with the corresponding region of initial airway tree 250. The weight assigned to each of the regions is also applied to initial reference points 210 located within that region, as explained below. During multi-rigid registration/optimized region registration, different regions of the airway trees are weighted differently such that regions with larger weights are favored in the process of aligning the initial airway tree 250 and the subsequent airway tree 350. For example, suppose an initial airway tree has two regions A and B, and the region weights are 0.9 for region A and 0.1 for region B. The weight of 0.9 is distributed evenly across all initial reference points of region A, and the weight of 0.1 is distributed evenly across all initial reference points of region B. For example, if region A has three (3) initial reference points, then each initial reference point in region A is assigned a weight of 0.9/3=0.3, and if region B has two (2) initial reference points, then each initial reference point in region B is assigned a weight of 0.1/2=0.05. A metric referred to as divergence is calculated in which the minimum distance from each initial reference point 210 to a prospective transformation of the subsequent airway tree 350 is multiplied by the weight assigned to the corresponding initial reference point 210, and the weighted minimum distances are averaged. Thus, the divergence is essentially a weighted average of the minimum distances, where initial reference points 210 having greater weight will have a greater effect on the divergence. The divergence metrics for prospective transformations are compared, and the transformation corresponding to the minimum divergence is selected as the transformation to use. As explained above, this process for a particular region is referred to as optimized region registration. The result of an optimized region registration is a particular registration that closely aligns the initial airway tree 250 with the subsequent airway tree 350 in the particular region. Thus, when there are multiple regions, optimized region registration is performed for each region, and the result is several separate registrations. The entire process of performing optimized region registration for all of the regions is what is referred to herein as multi-rigid registration. The particular way of determining divergence described above is exemplary, and other ways or determining divergence are contemplated to be within the scope of the present disclosure.

The TPS Transformation will now be described. The TPS Transformation is a transformation which maps points from the CT space defined by the initial 3D model to the CT space defined by the subsequent CT 3D model. Because the TPS Transformation is used to convert between points in the two CT spaces, the transform can conversely be "fitted" to known pairings of points in the two CT spaces. The TPS transformation maps the initial reference points 210 (initial CT space) and the reference points 310 (subsequent CT space) in a manner that permits interpolation of additional points in each space. Points in the subsequent CT space are denoted as $X_i=(X_i, Y_i, Z_i)$, and points in the initial CT space are denoted as $x_i=(x_i, y_i, z_i)$. For TPS Transformation, the plurality of initial reference points 210 (initial airway tree 250) and the plurality of reference points 310 (subsequent airway tree 350) are defined as $\{(x, X)\}=\{(x_i, y_i, z_i), (X_i, Y_i, Z_i)\}$, for i=1, N where N is the number of initial reference point 210 and reference point 310 pairs. Using a TPS Transform, each initial reference point from set $\{x\}$, defining plurality of initial reference points 210, are paired with each reference point from set $\{X\}$, defining plurality of reference points 310. Certain reference points and initial reference points are selected as fiducial points "F" within subsequent airway tree 350 and initial airway tree 250. Fiducial points "F" provide an initial pairing of plurality of reference points 310 with plurality of initial reference points 210. Matching is constructed between all fiducial points "F" and filtering may be used to eliminate incorrect matches between fiducial points "F" which are too distant to be proper matches. Furthermore, as explained below, additional pairs of points can be identified using multi-rigid registration to derive the TPS Transformation. In determining the pairing between the plurality of reference points 310 and the plurality of initial reference points 210, it is contemplated that reference points 310 and initial reference points 210 which are located at the terminal ends are not paired or matched.

Following matching of the initial reference points 210 and reference points 310, the TPS Transformation may be derived. The TPS Transform between initial reference point $x_i=(x_i, y_i, z_i)$ and reference point $X_i=(X_i, Y_i, Z_i)$ is given by the following equation:

$$X_i = \sum_{k=1}^{N} w_k \psi(\|x_i - x_k\|) + p(x_i), \quad (1)$$

where $$p(x_i) = a_0 + a_1 x_i + a_2 y_i + a_3 z_i. \quad (2)$$

$w_k$ are weights and $a_{0 \ldots 3}$ are coefficients corresponding to the linear portion of the transformation. Deriving the TPS Transform involves determining the values $w_k$ and $a_{0 \ldots 3}$ that satisfy equations (1) and (2), given the known pairs of points $\{(x, X)\}$, and given the further constraints shown in equations (3) and (4):

$$\begin{pmatrix} B + \lambda I & Q \\ Q^T & 0 \end{pmatrix} \begin{pmatrix} w \\ a \end{pmatrix} = \begin{pmatrix} f \\ 0 \end{pmatrix} \quad (3)$$

$$B_{ij} = \psi(\|x_i - x_j\|), \quad Q_{i, 1 \ldots 4} = \{1, x_i, y_i, z_i\}, \lambda > 0 \quad (4)$$

where $\lambda$ is a smoothness parameter, which determines how close initial reference points 210 have to be mapped to reference points 310, I is a matrix of values 1 to N, w is a matrix of values $w_k$, a is the matrix of values $a_{0 \ldots 3}$, and $\psi()$ is some norm. The value of $\lambda$ depends on the noise level in the data and the number of reference points, and usually is less than or equal to 0.05. In various embodiments, the value of the smoothness parameter can be in the range between 0 and 10/n, where n is the number of reference point-survey point pairs.

As mentioned above, multi-rigid registration enables identification of additional pairs of points in the CT spaces for use in deriving the TPS Transform. Multi-rigid registration, as explained above, is a mechanism that converts locations in the initial CT space to locations in the subsequent CT space. This mechanism can be inverted so that coordinates in the subsequent CT space can be converted to coordinates in the initial CT space. In various embodiments, inverse multi-rigid registration can be used to identify additional pairs of points for deriving the TPS Transform. Starting with the reference points 310 in the subsequent CT space and applying the inverse multi-rigid registration to them, corresponding points in the initial CT space can be determined to form point pairs for deriving the TPS Transform using equations (1) through (4). Although multi-rigid registration has been described, it is contemplated that other types of registration and inverse registration can be used to identify pairs of points, and are within the scope of the present disclosure.

The foregoing described rigid registration, multi-rigid registration, and TPS Transformation. What will now be described relates to geometric filtering and topological filtering.

Figure 3:
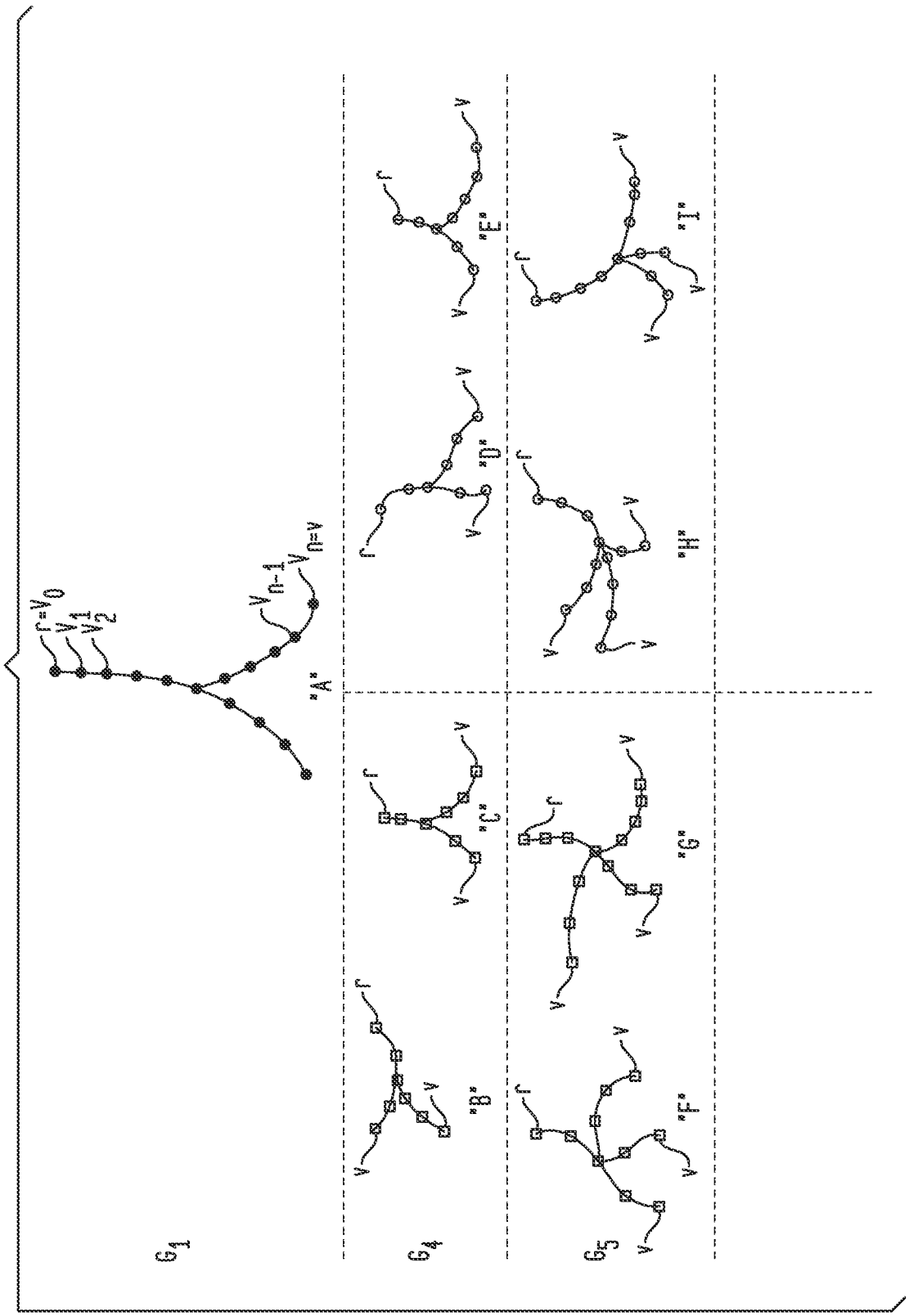
FIG. 3 are illustrations of the initial airway tree and the subsequent airway tree of FIG. 2 deconstructed into airway branches, provided in accordance with an embodiment of the present disclosure.

FIG. 3 illustrates either initial airway tree 250 and subsequent airway tree 350 as each may be deconstructed into airway branches "A"-"I" at different generation bifurcations such as "$G_1$," "$G_4$," and "$G_5$". Airway branch "A" is illustrated at the first generation bifurcation "$G_1$" for both initial airway tree 250 and subsequent airway tree 350. Airway branches "B" and "C" illustrate the airway branches at the fourth generation bifurcation "$G_4$" for initial airway tree 250 and airway branches "D" and "E" illustrate the airway branches at fourth generation bifurcation "$G_4$" for subsequent airway tree 350. Similarly, airway branches "F" and "G" and airway branches "H" and "I" illustrate the airway branches at fifth generation bifurcation "$G_5$," for initial airway tree 250 and subsequent airway tree 350, respectively. The airway branches of the second and third generation bifurcation are not shown because reference nodes "r," as further described herein, from the first generation bifurcation "$G_1$" may be used to generate piecewise linear polylines (which for convenience, may be referred to herein as "polylines") of the second and third generation bifurcation. Polylines are a connected sequence of line segments, which together create a single object. Each of airway branches "A"-"I" includes multiple polylines which are based on node "v" and reference node "r," and generate the polyline defined as $\{v_0=r, v_1, v_2, \bullet\bullet\bullet, v_{n-1}, v_n=v\}$, where r is the starting/root node for the branch, and nodes $v_1$-$v_n$ are the nodes within that polyline for the airway branch. By comparing potentially matching airway branches from initial airway tree 250 and subsequent airway tree 350 using polylines and geometric filtering, a determination can be made of whether there is an actual match.

Figure 4A:
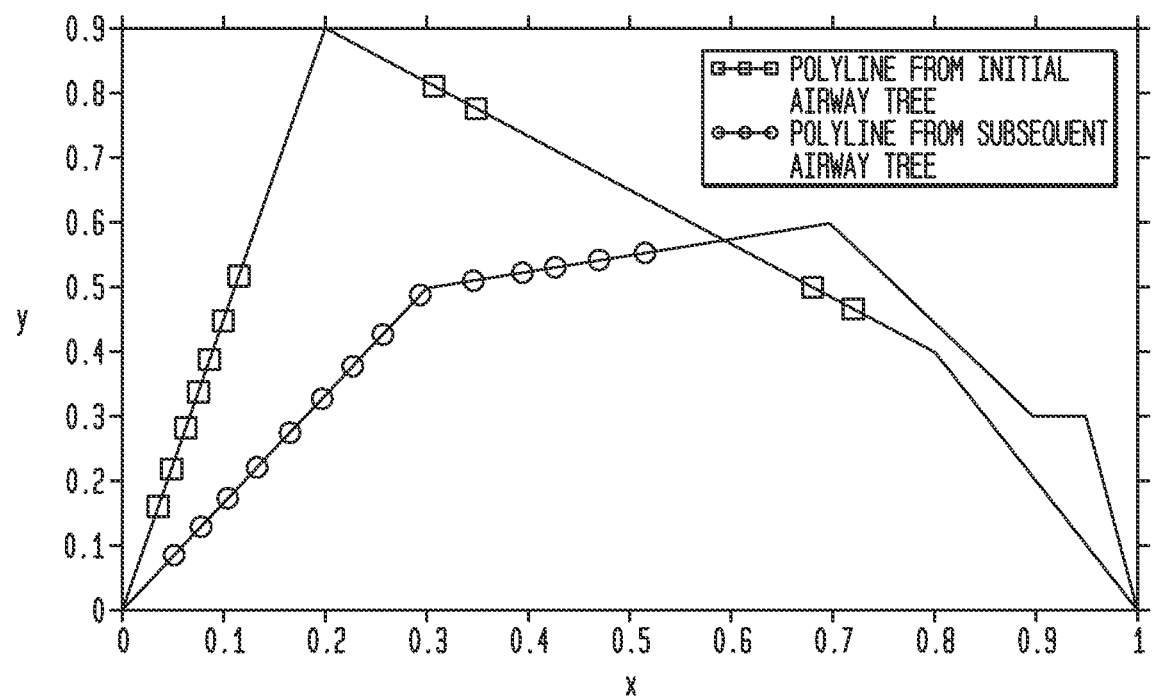
FIGS. 4A-4D are four illustrations of data used for and by geometric filters, provided in accordance with an embodiment of the present disclosure.

Turning now to FIGS. 4A-4D, four illustrations of data used for geometric filters are shown. The geometric filters compare the geometric structure of airway branches, and based on the comparison allows a determination to be made of whether those branches should be matched. FIG. 4A illustrates the graph of a piecewise derivative transformation of two branches of the airways (for example airway branch "B" for initial airway tree 250, of FIG. 3, with airway branch "D" for subsequent airway tree 350, each at the fourth generation bifurcation "$G_4$") for use with a piecewise derivative overlapping (PDO) filter. Using the PDO, a comparison of the shapes of the two branches can be made to determine whether the two branches should be matched. The two branches can be deconstructed into the polyline $\{v_0=r, v_1, v_2, \bullet\bullet\bullet, v_{n-1}, v_n=v\}$, either generated from initial airway tree 250 or subsequent airway tree 350, and the PDO filter is utilized first by translating the polyline by $-v$ in order to have the polyline start at the origin. Next, the length L of the polyline is normalize by $1/\lambda r-v\|^2$ and the vector r-v is rotated in order to align it with $(1,0,0)^T$. The resulting polyline is then defined by: $\{s=(0,0,0)^T, s_1, s_2, \bullet\bullet\bullet, s_n=(1,0,0)^T\}$. Next, the polyline can be parameterized with the variable t, such that:

$$f(t) = (1-\alpha)s_i + (\alpha)s_{i+1} \quad t \in \left(\frac{l_i}{L}, \frac{l_{i+1}}{L}\right) \tag{5}$$

$$\alpha = \frac{tL - l_i}{l_{i+1} - l_i}, \quad l_i = \sum_{j=1}^{i}\|s_j - s_{j-1}\|^2, \quad L = l_n \tag{6}$$

Next, the piecewise constant derivative $g_i$ over the interval [0, 1] can be computed, such that:

$$g(t) = \left(1 - \frac{L}{l_{i+1} - l_i}\right)s_i + \left(\frac{L}{l_{i+1} - l_i}\right)s_{i+1} \quad t \in \left(\frac{l_i}{L}, \frac{l_{i+1}}{L}\right) \tag{7}$$

Next, g can be normalized on each interval. For two polylines which potentially match, if they are similar in shape, their piecewise constant derivative should overlap. The overlapping measurement is computed by:

$$\max_{\phi \in [0, 2\pi]} \int_0^1 (1 + g_1(t)A_\phi g_2(t))dt \tag{8}$$

where $A_\phi$ defines a rotation around the x-axis operator, $g_1(t)$ is the piecewise constant derivative for the first polyline being compared, and $g_2(t)$ is the piecewise constant derivative for the second polyline being compared. The explicit solution of the optimization problem is:

$$\max_{\phi \in [0, 2\pi]} \frac{1}{2}\int_0^1 (1 + g_1(t)A_\phi g_2(t))dt = C + \sqrt{D^2 + E^2} \in [0, 1] \tag{9}$$

$$C := \int_0^1 (g_{11}g_{21})dt,$$

$$D := \int_0^1 (g_{12}g_{22} + g_{13}g_{23})dt, \tag{10}$$

$$E := \int_0^1 (g_{12}g_{23} - g_{13}g_{22})dt$$

A threshold of 0.80 difference between the two polylines can be set, such that if the difference between the piecewise derivative transformation for the two polylines is greater than 0.80, those polylines, and the corresponding airway branches used to create the polylines should not be matched.

Figure 4B:
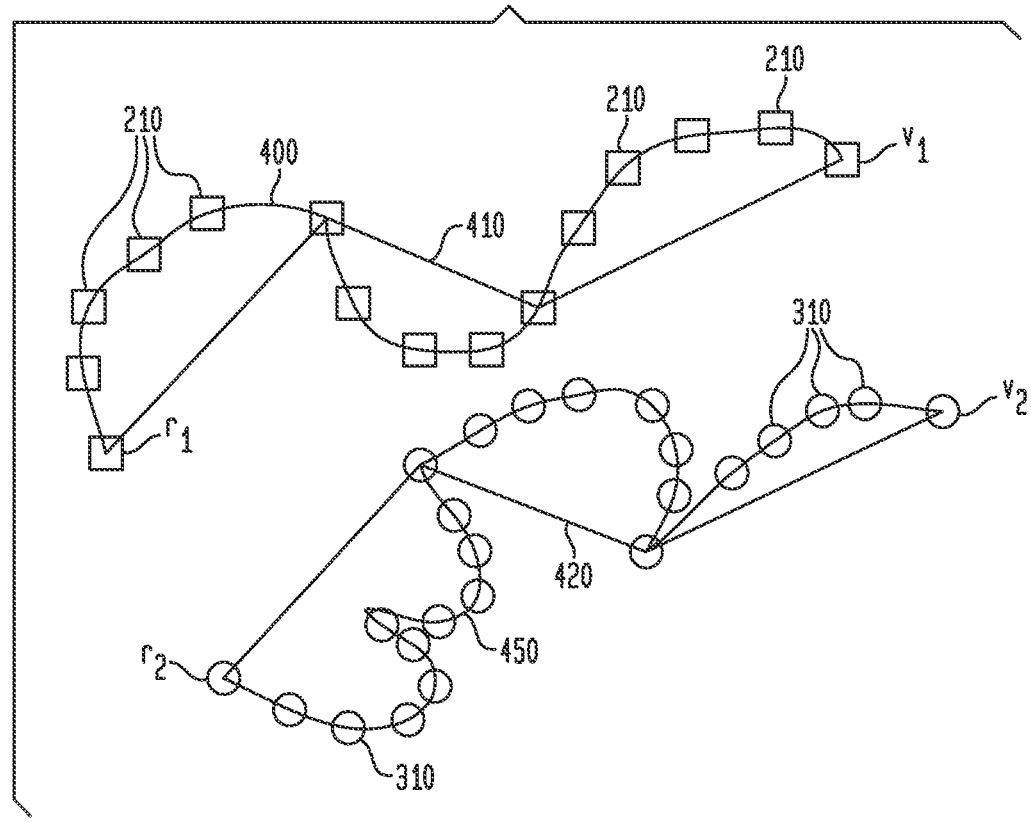

Referring now to FIG. 4B, an illustration of curvature similarities and differences is shown. Using a curvature similarities filter, a determination can be made whether the curvature of branches of initial airway tree 250 is similar enough to branches of subsequent airway tree 350. Polylines 400 and 450 are shown as curved lines with linear interpolants, 410 and 420, respectively, connecting the curved portions of polylines 400, 450. Polyline 400 is a curved line segment of an airway from initial airway trees 250 and includes plurality of initial reference points 210. Polyline 400 extends from reference node $r_1$ to node $v_1$. Polyline 450 is a curved line segment of an airway from subsequent airway tree 350 and includes plurality of reference points 310 and extends from reference node $r_2$ to node $v_2$. Using polylines 400, 450, linear interpolants, 410, 420, can be generated and provide a general idea of the curvature of polylines 400, 450. As shown in FIG. 4B, based on linear interpolants 410, 420 alone, which are almost identical, they would suggest that polyline 400 is a good match with polyline 450. However, based on the difference in curvatures, polyline 400 is actually a poor match with polyline 450. Using the following formula, a metric for the curvature of each polyline and thus an airway can be determined:

$$c = \frac{L}{\|r - v\|^2} \qquad (11)$$

where c is the curvature of a polyline of length L for the airway. Once c is determined for each polyline a comparison can be made to determine if a threshold is met. For example, a threshold value of 0.20 can be set, such that if the difference between the curvature c for polyline 400 and the curvature c for polyline 450 is greater than 0.20, then those polylines are a poor match and there corresponding branches airways are a poor match. Those polylines which are determined to be poor matches are not matched and, thus, certain airways may not be matched. Rather, in at least one embodiment, the system continues searching for an airway that is a match until all or substantially all potential airways are analyzed. In some instances, there may remain airways that are not matched between the initial 3D model and the subsequent 3D model, and such airways may not be used for navigation planning or clinical analysis.

In addition to the curvature similarities filter, a length similarity filter can be applied to two matched polylines. Each of the previous filters, PDO filter and curve similarity filter, are scaled and transformed, thus they are independent of absolute size. The length similarity filter can be applied to compare the absolute lengths of polylines. Using the following condition:

$$|L1 - L2| < (0.20 \cdot \max\{L1, L2\}) \qquad (12)$$

a determination can be made as to whether the difference in length between a polyline from initial airway tree 250 (L1) which potentially matches with a polyline from subsequent airway tree 350 (L2), is greater than twenty percent (20%). If the difference is greater than twenty percent (20%), the two polylines are a poor match and are unmatched. The difference of twenty percent is exemplary and other percentages can be applied in various embodiments.

Figure 4C:
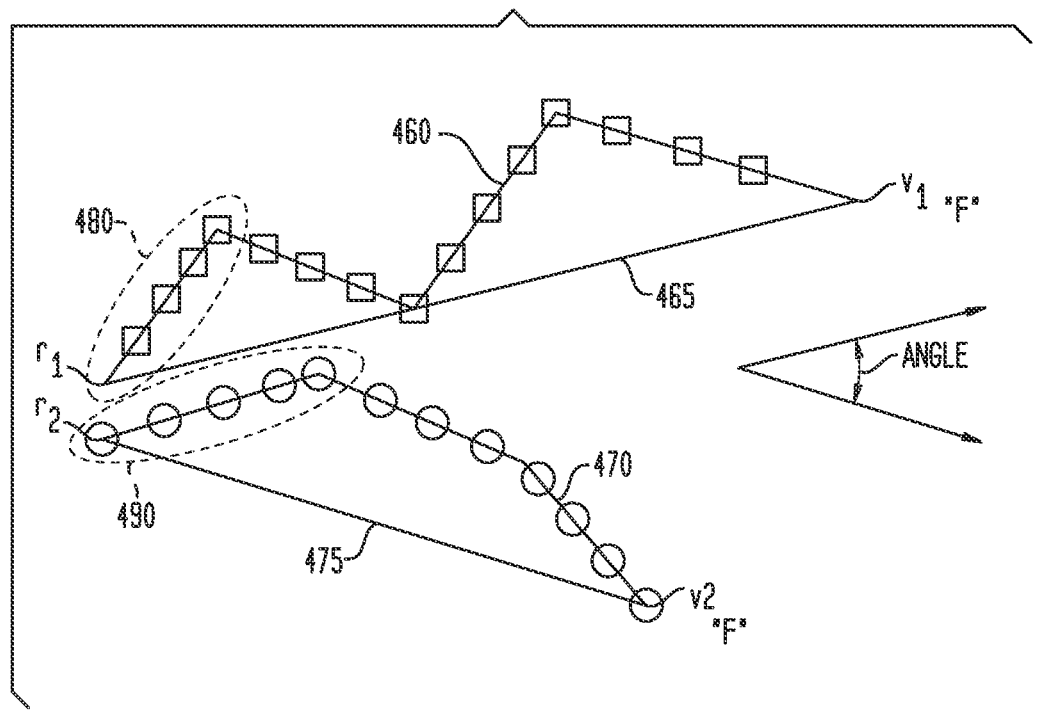

Referring now to FIG. 4C, polylines 460 and 470 are illustrated. Polylines 460, 470 are based on branches of airway trees 250, 350, respectively, which begin at reference node r and end at node v, where node v is also a fiducial point "F." Polylines 460, 470 further include polyline section 480 and polyline section 490, respectively, which are the first sections of each of polylines 460 and 470. As illustrated in FIG. 4C, polyline 460 has an upward curve starting at reference node $r_1$ and ending at node $v_1$, while polyline 470 has a downward curve starting at reference node $r_2$ and ending at node $v_2$. The upwards and downward curves of polylines 460, 470, respectively, are more easily shown through straight lines 465, 475 which directly connect reference nodes $r_1$, $r_2$ with nodes $v_1$, $v_2$, respectively. Based on the PDO, curve similarity, and length similarity filters, polyline 460 would likely be matched with polyline 470. However, by applying a global angle similarity filter, a determination can be made whether the global angle difference between polylines 460, 470 is greater than a threshold value. Using the formula:

$$\theta = \cos^{-1} \frac{(r_1 - v_1) \cdot (r_2 - v_2)}{\|r_1 - v_1\|^2 \|r_2 - v_2\|^2} \qquad (13)$$

where θ is the global angle difference between two polylines, a determination can be made of the global angle difference between polyline 460 and polyline 470. A threshold value of six degrees) (6°) can be used, such that if the angle difference is greater than six degrees (6°) the two polylines are not a match. The difference of six degrees is exemplary and other angle differences can be applied in various embodiments.

Figure 4D:
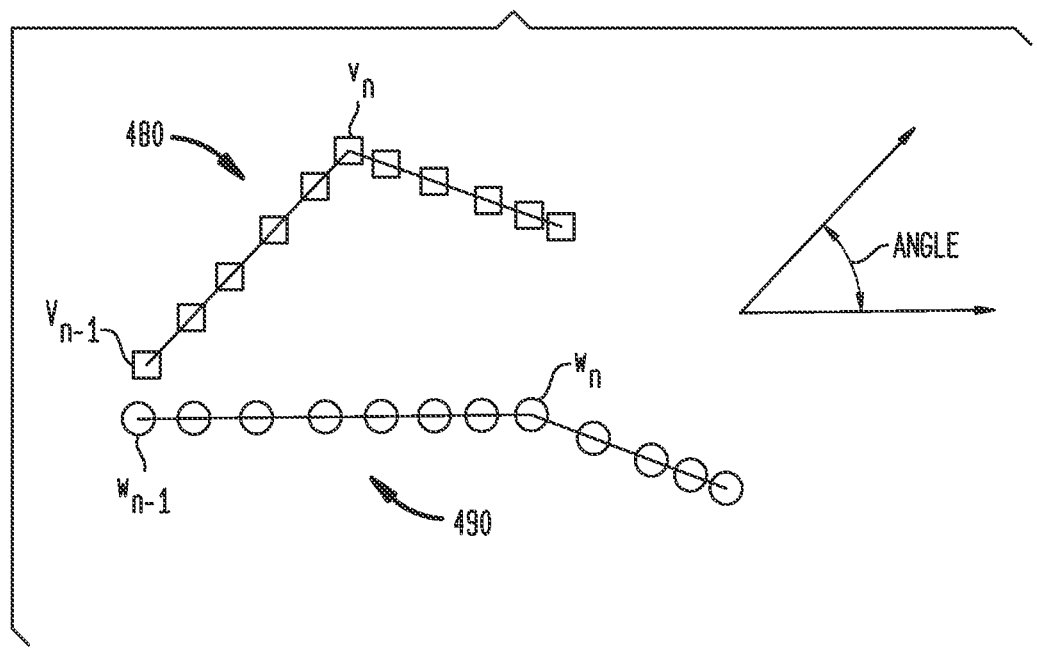

Referring now to FIG. 4D, polylines sections 480 and 490, of FIG. 4C, are illustrated in greater detail. Similar to the global angle similarity filter, a local angle similarity filter can be applied for each polyline section 480, 490. Although polyline sections 480, 490 are shown as the first segment of polylines 460, 470, polyline sections 480, 490 may be located at any polyline segment of polylines 460, 470. Generally, polyline section 480 extends from parent node $v_{n-1}$ to node $v_n$, while polyline section 490 extends from parent node $w_{n-1}$ to node $w_n$. By applying the local angle similarity filter, a determination can be made whether the local angle difference between polyline sections 480, 490 is greater than a threshold value. Using the formula:

$$\theta_2 = \cos^{-1} \frac{(v_n - v_{n-1}) \cdot (w_n - w_{n-1})}{\|v_n - v_{n-1}\|^2 \|w_n - w_{n-1}\|^2} \qquad (14)$$

where $\theta_2$ is the local angle difference between polyline sections 480, 490, a determination can be made of the local angle difference between polyline segment 460 and polyline segment 470. A threshold value of fifteen degrees (15°) can be used, such that if the local angle difference is greater than fifteen degrees (15°), the two polyline segments are not a match. The difference of fifteen degrees is exemplary and other angle differences can be applied in various embodiments.

Figure 4E:
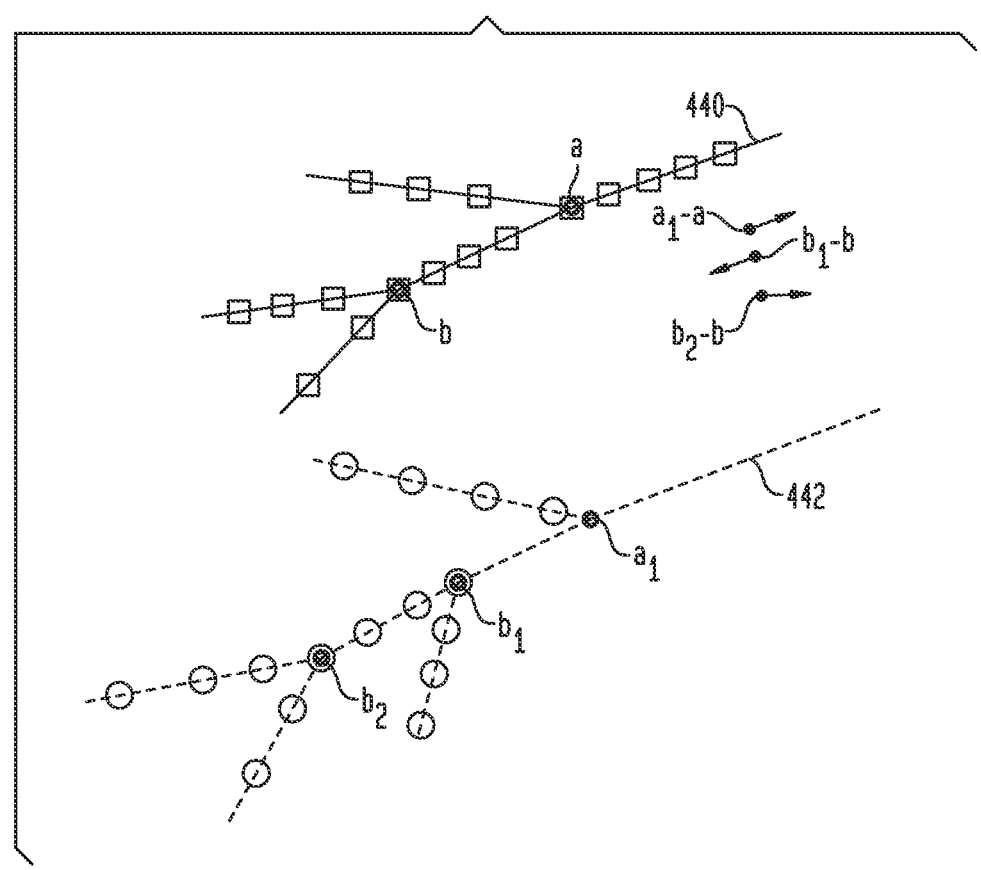
FIGS. 4E-4G are three illustrations of data used for and by topology filters, provided in accordance with an embodiment of the present disclosure.
Figure 4F:
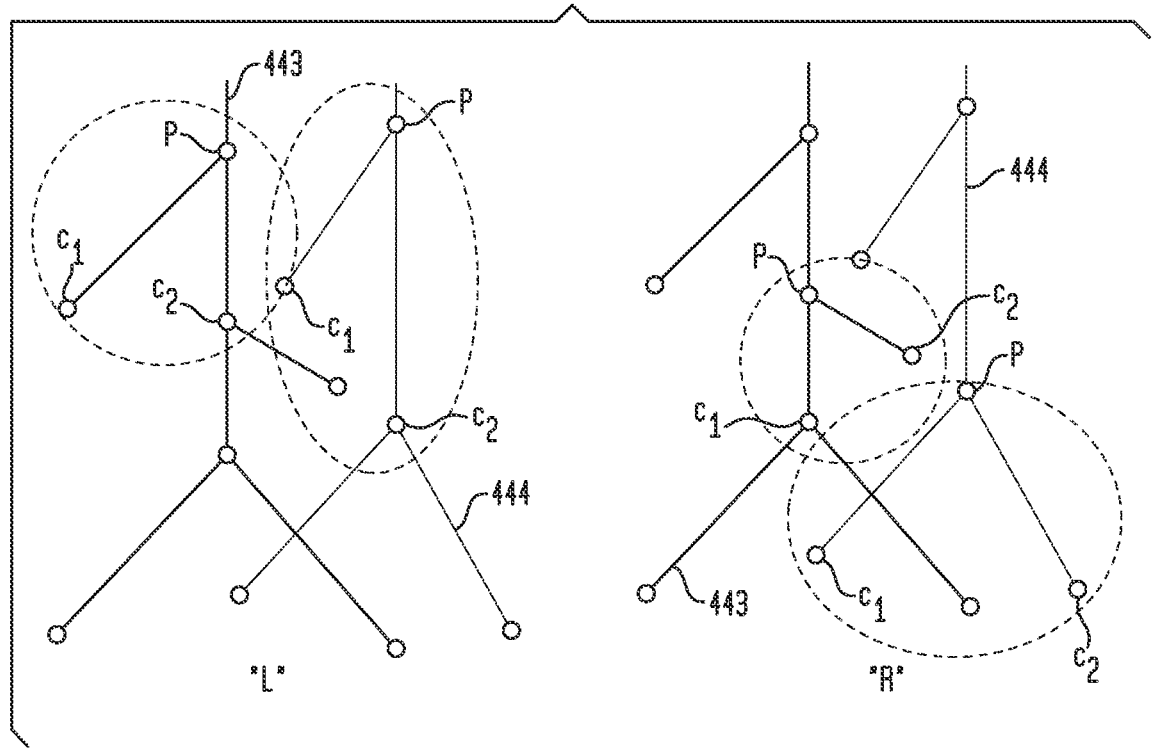
Figure 4G:
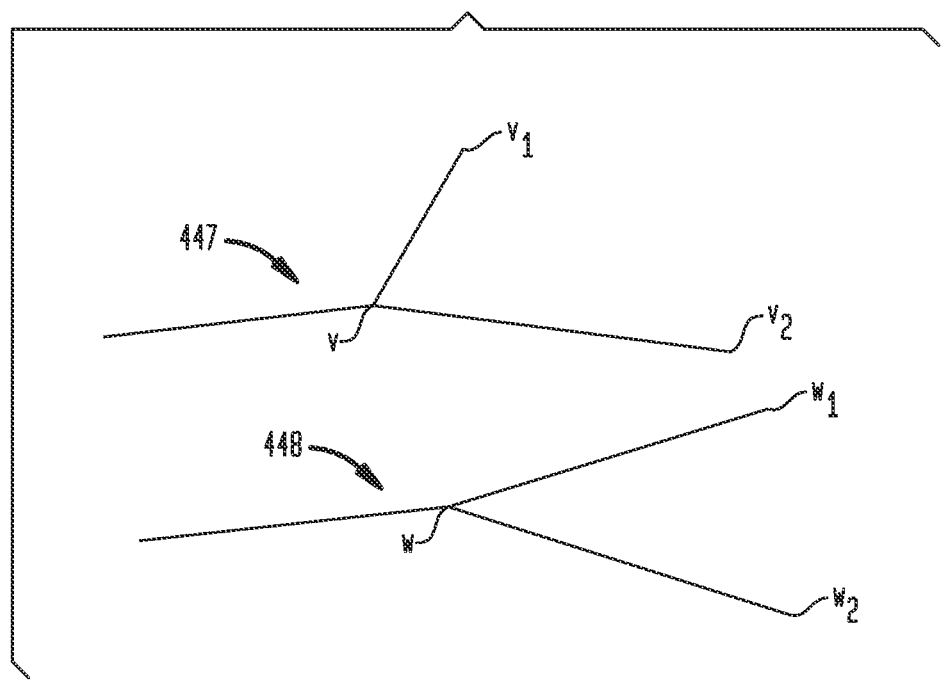

Referring now to FIGS. 4E-4G, three illustrations of data used for topology filters are shown. The topology filters are used to eliminate plausible matching. Plausible matching generally occurs where, the generation bifurcation number between two matched nodes is greater than 2 and the generation bifurcation number for both matched nodes is greater than 6. In various embodiments where there is plausible matching, those nodes can be manually identified. Referring now to FIG. 4E, an illustration of initial subtree 440 (from initial airway tree 250) and subsequent subtree 442 (from subsequent airway tree 350) is shown. Included within initial subtree 440 are node "a" and node "b," which begin branches from the main stem of initial subtree 440. Included within subsequent subtree 442 are node $a_1$, node $b_1$, and node $b_2$, which begin branches from the main stem of subsequent subtree 442. Through the use of a local deformation consistency (LDC) filter, a determination can be made of whether the local deformation of nodes within a subtree is consistent to the subtree, locally, or consistent to a more global deformation. In particular, all nodes in the same subtree are not expected to have very contradictive local deformation. In order to determine local deformation, given two nodes, located in initial subtree 440 and subsequent subtree 442, which have been matched, for example, node a of initial subtree 440 and node $a_1$ of subsequent subtree 442, a displacement vector $v_p$, defined as $a_1 - a$, can be determined. If nodes a, $a_1$ are of generation bifurcations "$G_6$" or higher, the parent node from the lower generation bifurcation "$G_5$"-"$G_1$," which has a uniquely determined match is utilized. A uniquely determined match occurs in a case where two nodes only appear in one matching. If the uniquely determined matched node is located far away from the current node, the LDC filter is not utilized. Otherwise, uniquely determined displacement vector $v_c$ is determined for all matched nodes (nodes along branches extending from nodes a, b, $a_1$, $b_1$, and/or $b_2$). The displacement vectors $v_p$ and uniquely determined displacement vector $v_c$ are normalized and compared using the dot product. If the dot product is close to −1 and length of original vector is greater than a predetermined maximum value (e.g., 2), the matching is determined not to be consistent with local deformation. This is shown as follows:

$$\frac{(v_c) \cdot (v_p)}{\|v_c\| \|v_p\|} < -0.5, \|v_c\| > 2 \tag{15}$$

The threshold values are exemplary and other threshold values can be applied in various embodiments.

For example, referring to FIG. 4E and using the LDC filter, a determination can be made of which nodes are properly matched, such that initial subtree 440 and subsequent subtree 442 overlap as closely as possible. The solution for determining whether to match nodes $b_1$ and b or nodes $b_2$ and b requires the LDC filter. It can first be assumed that node a should be uniquely assigned to node $a_1$, after all previous filters are applied. Using the LDC filter, and equation (16), it can also be determined that the displacement vector $v_p$ of nodes $b_1$ and b is the opposite direction of the displacement vector $v_p$ of nodes $a_1$ and a, while the displacement vector $v_p$ of nodes $b_2$ and b is the same direction of the displacement vector $v_p$ of nodes $a_1$ and a, therefore the matching of $b_2$–b is preferred as the correct match.

Referring now to FIG. 4F, initial subtree 443 and subsequent subtree 444 are illustrated. Using a patch transformation consistency filter, the LDC filter as described in the detail description of FIG. 4E can be applied to small v-subtrees within both initial subtree 443 and subsequent subtree 444. Subtrees 443, 444 can be divided into several small v-subtrees as illustrated by the circled areas of subtree 443, 444. The small v-subtrees in subtrees 443, 444 include parent node p and two children nodes $c_1$, $c_2$. Using the LDC filter and based on the three nodes, p, $c_1$, and $c_2$, three displacement vectors can be determined, which can be used to quantify the magnitude of local deformation. As shown in FIG. 4F, the circled small v-subtrees of subtrees 443, 444 for "R" produces a different displacement vector $v_p$ compared the entire subtree, thus those circled small v-subtrees are incorrectly matched. In contrast, the circled small v-subtrees of subtrees 443, 444 for "L" produces an appropriate displacement vector $v_p$ as compared to the entire subtree, therefore those circled small v-subtrees of subtrees 443, 444 of "L" are appropriately matched. In the illustrated embodiment, it is assumed that "p" nodes are uniquely matched. Then, it remains to be determined whether node "$c_2$" of subtree 443 should be matched to node "$c_2$" of subtree 444, or whether children of node "$c_2$" in subtree 443 should be matched to node "$c_2$" of 444. In the "L" subtrees, the children of node "$c_2$" in subtree 443 should preferably be matched to node "$c_2$" of subtree 444 by examining the displacement of the three nodes in the subtrees. In the "R" subtrees, the displacement of the circled nodes are not consistent with displacement of "p", and the circled nodes should not be matched.

Referring now to FIG. 4G, initial subtree 447 and subsequent subtree 448 are illustrated. Included within initial subtree 447 are node v and vectors $v_1$, $v_2$ extending from node v. Included within subsequent subtree 448 are node w and vectors $w_1$ and $w_2$ extending from node w. The isomorphism scoring system seeks to first establish subjective mapping from initial subtree 447 to subsequent subtree 448, then establish subjective mapping from subsequent subtree 448 to initial subtree 447. The resulting mapping is an isomorphism. The selection is based on the following scoring system:

$$s = \|v - w\|^2 + \frac{1}{10} \left| \cos^{-1} \frac{(\vec{v}_1 \cdot \vec{v}_2)}{\|\vec{v}_1\|^2 \|\vec{v}_2\|^2} - \cos^{-1} \frac{(\vec{w}_1 \cdot \vec{w}_2)}{\|\vec{w}_1\|^2 \|\vec{w}_2\|^2} \right| \tag{16}$$

The isomorphism scoring system uses the Euclidean distance between matched nodes and the angle difference between two branching structures. If s is greater than 10, all duplicates are plausible and all are discarded. Finally a minimum score across the duplicates identifies the best candidates for matching. With regard to FIGS. 4A-4G and the specific threshold values, for the first several generation bifurcations, local nonlinear deformation is relatively small. However, as the generation bifurcations increases local non-linear deformation increases, thus in order to maintain matching between branches and nodes for higher generation bifurcations, it is contemplated that the threshold values used in the filters of FIGS. 4A-4G should be increased or decreased as the process moves through the airway tree from trachea to pleura boundaries. For higher generations, larger angle similarity thresholds may be used because the angle vector to reference node could be bigger, such as 10 degrees, due to far away branches being softer and susceptible to larger deformations. Additionally, local angle similarity thresholds could be larger and could range from 15 degrees to 20 degrees.

Figure 5:
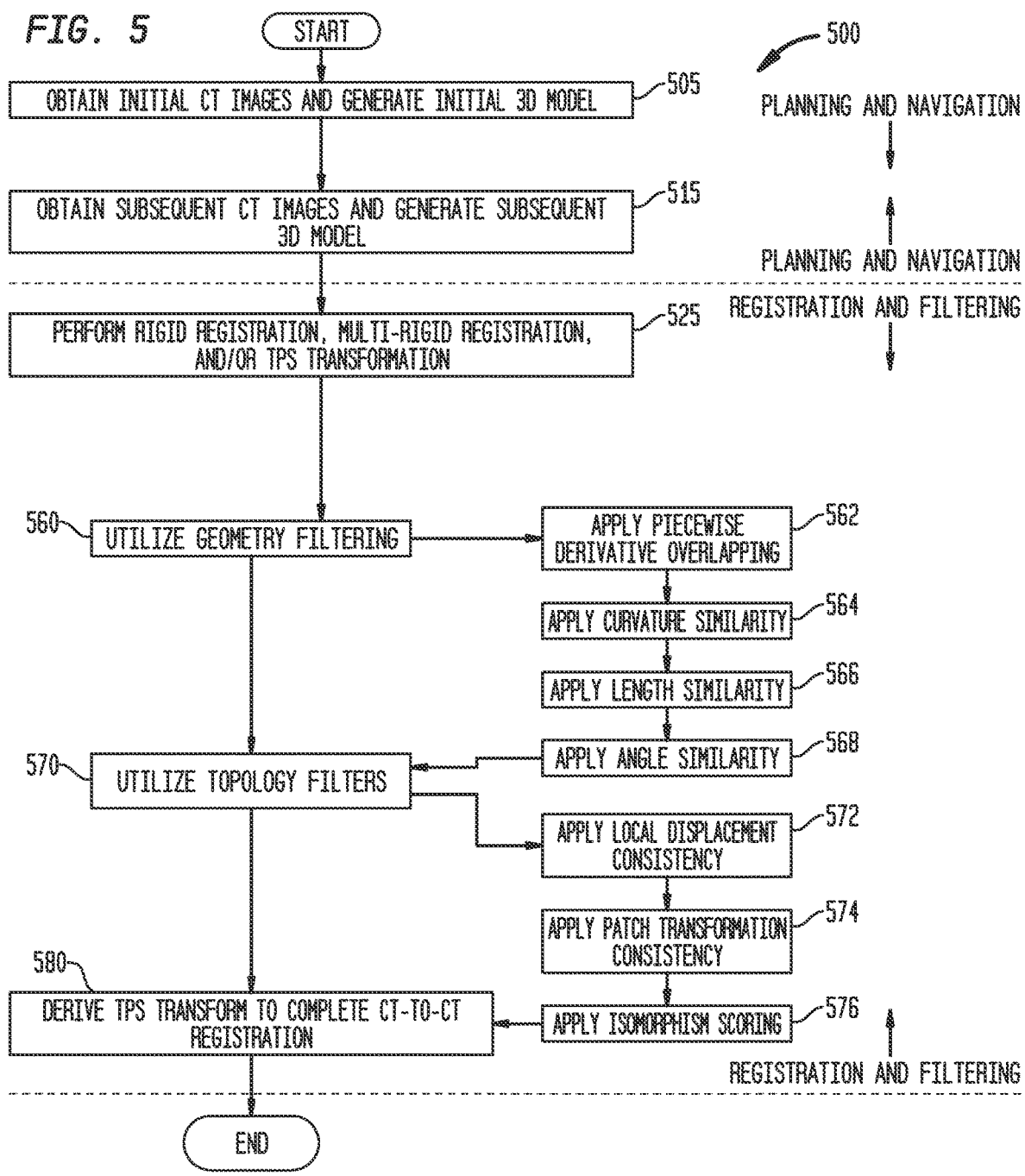
FIG. 5 is a flowchart of a method of registering an initial 3D volumetric model of a patient's airways with a subsequent 3D volumetric model of the patient's airways, provided in accordance with an embodiment of the present disclosure.

FIG. 5 illustrates a flowchart of method 500 detailing automatic registration of an initial 3D volumetric model of a patient's airways from initial CT images with a subsequent 3D volumetric model of the patient's airways from subsequent CT images. Method 500 may be implemented, at least in part, by the processor 604 executing instructions stored in the memory 602 (FIG. 6). Additionally, the particular sequence of steps shown in methods 500 is provided by way of example and not limitation. Thus, the steps of method 500 may be executed in sequences other than the sequences shown in FIG. 5 without departing from the scope of the present disclosure. Further, some steps shown in method 500 may be concurrently executed with respect to one another instead of sequentially executed with respect to one another.

As further described herein, method 500 details planning and navigation (steps 505-515) and registration and filtering (steps 525-580), in accordance with the present disclosure. At step 505, images from an initial CT scan are obtained and an initial 3D model, such as initial 3D model 200, is generated. The initial CT images may be stored in memory 602 (FIG. 6) and obtained by a clinician during planning. At step 515, subsequent CT images are obtained, for example, via a CBCT scan, and a subsequent 3D model, such as subsequent 3D model 300 is generated, which may also be stored in memory 602.

Next, at step 525, one or more of rigid registration, multi-rigid registration, or TPS transformation, which are described above herein, is performed. It is further contemplated that after step 525, method 500 may proceed directly to step 580 and complete the registration of the initial 3D model to the subsequent 3D model. However, in order to provide increased registration accuracy, method 500 may also perform step 560 to step 576, whereby geometric and topology filters are utilized.

Next, at steps 560-580, filtering is performed. At steps 560-568, processor 604 utilizes geometric filtering. At steps 562-568, as described in the detailed description of FIGS. 4A-4D, the PDO filter, the curve similarity filter, the length similarity filter, and the angle similarity filters are applied to polylines from airway trees 250,350, and where it is determined that there exists poor matching between corresponding polylines from airway trees 250,350, those polylines and airways are no longer matched.

Next, at steps 570-576, processor 604 utilizes topology filtering. At steps 572-576, as described in the detailed description of FIGS. 4E-4G, the local displacement consistency, the patch transformation consistency, and the isomorphism scoring system are applied, by which nodes and branches, which potentially match may be determined to be unmatched. Next, at step 580, based on the geometry filtering and topology filtering of steps 560-576, portions of the initial 3D model and the subsequent 3D model will be matched, and such matches can be used to derive a TPS Transformation for registering the initial 3D model with the subsequent 3D model. Thus, based on the matched and unmatched nodes from steps 560-576, initial 3D model 200 can be registered with subsequent 3D model 300.

Referring now to FIG. 6, electromagnetic navigation system 10 is provided in accordance with the present disclosure. One such electromagnetic navigation system is the ELECTROMAGNETIC NAVIGATION BRONCHOSCOPY® system currently sold by Medtronic PLC. Among other tasks that may be performed using electromagnetic navigation system 10 are planning a pathway to target tissue, navigating a positioning assembly to the target tissue, navigating a biopsy tool to the target tissue to obtain a tissue sample from the target tissue using the biopsy tool, digitally marking the location where the tissue sample was obtained, and placing one or more echogenic markers at or around the target. Although the present disclosure relates more specification to a CT-to-CT registration, an electromagnetic navigation system 10 is utilized in conjunction with the CT-to-CT registration.

Electromagnetic navigation system 10 generally includes an operating table 40 configured to support a patient; a bronchoscope 50 configured for insertion through the patient's mouth and/or nose into the patient's airways; monitoring equipment 60 coupled to bronchoscope 50 for displaying video images received from bronchoscope 50; a tracking system 70 including a tracking module 72, a plurality of reference sensors 74, and an electromagnetic (EM) field generator 76; a workstation 80 including software and/or hardware used to facilitate pathway planning, identification of target tissue, navigation to target tissue, and digitally marking the biopsy location FIG. 6 also depicts two types of catheter guide assemblies 90, 100. Both catheter guide assemblies 90, 100 are usable with electromagnetic navigation system 10 and share a number of common components. Each catheter guide assembly 90, 100 includes a handle 91, which is connected to an extended working channel (EWC) 96. EWC 96 is sized for placement into the working channel of a bronchoscope 50. In operation, a locatable guide (LG) 92, including an EM sensor 94, is inserted into EWC 96 and locked into position such that EM sensor 94 extends a desired distance beyond a distal tip 93 of EWC 96. The location of EM sensor 94, and thus the distal end of EWC 96, within an EM field generated by EM field generator 76 can be derived by tracking module 72, and workstation 80. Catheter guide assemblies 90, 100 have different operating mechanisms, but each contain a handle 91 that can be manipulated by rotation and compression to steer distal tip 93 of LG 92 and EWC 96. Catheter guide assemblies 90 are currently marketed and sold by Medtronic PLC under the name SUPERDIMENSION® Procedure Kits. Similarly, catheter guide assemblies 100 are currently sold by Medtronic PLC under the name EDGE' Procedure Kits. Both kits include a handle 91, EWC 96, and LG 92.

As illustrated in FIG. 6, the patient is shown lying on operating table 40 with bronchoscope 50 inserted through the patient's mouth and into the patient's airways. Bronchoscope 50 includes a source of illumination and a video imaging system (not explicitly shown) and is coupled to monitoring equipment 60, e.g., a video display, for displaying the video images received from the video imaging system of bronchoscope 50.

Catheter guide assemblies 90, 100 including LG 92 and EWC 96 are configured for insertion through a working channel of bronchoscope 50 into the patient's airways (although the catheter guide assemblies 90, 100 may alternatively be used without bronchoscope 50). LG 92 and EWC 96 are selectively lockable relative to one another via a locking mechanism 99. A six degrees-of-freedom electromagnetic tracking system 70, e.g., similar to those disclosed in U.S. Pat. No. 6,188,355, and US Patent Publication No. 2014/0281961, the entire contents of each of which is incorporated herein by reference, or any other suitable positioning measuring system, is utilized for performing navigation, although other configurations are also contemplated. Tracking system 70 is configured for use with catheter guide assemblies 90, 100 to track the position of EM sensor 94 as it moves in conjunction with EWC 96 through the airways of the patient, as detailed below.

Electromagnetic field generator 76 is positioned beneath the patient. Electromagnetic field generator 76 and the plurality of reference sensors 74 are interconnected with tracking module 72, which derives the location of each reference sensor 74 in six degrees of freedom. One or more of reference sensors 74 are attached to the chest of the patient. The six degrees of freedom coordinates of reference sensors 74 are sent to workstation 80, which includes and application 81 which uses data collected by sensors 74 to calculate a patient coordinate frame of reference.

Also shown in FIG. 6 is a surgical instrument 102 that is insertable into catheter guide assemblies 90, 100 following navigation to a target and removal of LG 92. Surgical tool 102 may include and is not limited to, tissue collection tool, microwave ablation tool, surgical stapling tools, radiotherapy ink application tools, and the like. Surgical tool 102 is further configured for use in conjunction with tracking system 70 to facilitate navigation of surgical tool 102 to the target tissue, tracking of a location of surgical tool 102 as it is manipulated relative to one or more targets 204.

During procedure planning, workstation 80 utilizes computed tomographic (CT) image data for generating and viewing the 3D model of the patient's airways, enables the identification of target tissue on the 3D model (automatically, semi-automatically or manually), and allows for the selection of a pathway through the patient's airways to the target tissue. More specifically, the CT scans are processed and assembled into a 3D volume, which is then utilized to generate the 3D model of the patient's airways. The 3D model may be presented on a display monitor associated with workstation 80, or in any other suitable fashion. Using workstation 80, various slices of the 3D volume and views of the 3D model may be presented and/or may be manipulated by a clinician to facilitate identification of a target and selection of a suitable pathway through the patient's airways to access the target. The 3D model may also show marks of the locations where previous biopsies were performed, including the dates, times, and other identifying information regarding the tissue samples obtained. These marks may also be selected as the target to which a pathway can be planned. Once selected, the pathway is saved for use during the navigation procedure. Examples of a suitable pathway planning system and method is described in U.S. Patent Application Publication Nos. US 2014/0281961, US 2014/0270441, and US 2014/0282216, all entitled PATHWAY PLANNING SYSTEM AND METHOD, filed on Mar. 15, 2013, by Baker, the entire contents of each of which is incorporated herein by reference.

System diagram 600 of workstation 80 includes memory 602, processor 604, display 606, network interface 608, input device 610, and/or output module 612. Memory 602 includes any non-transitory computer-readable storage media for storing data and/or software that is executable by processor 604 and which controls the operation of workstation 80. In an embodiment, memory 602 may include one or more solid-state storage devices such as flash memory chips. Alternatively or in addition to the one or more solid-state storage devices, memory 602 may include one or more mass storage devices connected to the processor 604 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 604. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by workstation 80.

Memory 602 may store application 81 and/or CT data 614. Application 81 may, when executed by processor 604, cause display 606 to present user interface 616. Network interface 208 may be configured to connect to a network such as a local area network (LAN) consisting of a wired network and/or a wireless network, a wide area network (WAN), a wireless mobile network, a Bluetooth network, and/or the internet. Input device 510 may be any device by means of which a user may interact with workstation 50, such as, for example, a mouse, keyboard, foot pedal, touch screen, and/or voice interface. Output module 612 may include any connectivity port or bus, such as, for example, parallel ports, serial ports, universal serial busses (USB), or any other similar connectivity port known to those skilled in the art.

Memory 602 includes any non-transitory computer-readable storage media for storing data and/or software that is executable by processor 604 and which controls the operation of workstation 80. In an embodiment, memory 602 may include one or more solid-state storage devices such as flash memory chips. Alternatively or in addition to the one or more solid-state storage devices, memory 602 may include one or more mass storage devices connected to the processor 604 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 604. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by workstation 80.

Various methods of manual and automatic registration are envisioned, some of which are more fully described in co-pending U.S. patent application Ser. No. 14/790,581, entitled REAL TIME AUTOMATIC REGISTRATION FEEDBACK, filed on Jul. 2, 2015, by Brown et al., the entire contents of which is incorporated herein by reference.

What is claimed is:

1. A system for registering initial images of a luminal network with subsequent images of the luminal network, the system comprising:
 a computing device including a processor and a memory; and
 an application, stored in the memory and executed by the processor, which when executed, causes the computing device to:
  generate an initial model of a luminal network based on initial images of the luminal network;
  generate a subsequent model of the luminal network based on subsequent images of the luminal network;
  match the initial model with the subsequent model;
  for each of the initial and subsequent models of the luminal network:
   deconstruct the luminal network into a plurality of generations, each generation of the plurality of generations originating at a generation bifurcation of the luminal network and having a subset of airway branches extending from the generation bifurcation;
   generate, for each airway branch of a respective subset of airway branches of each generation, a curved line segment; and
   determine a curvature of each curved line segment; and
  match a plurality of curved line segments of each subset of airway branches of the initial model with a plurality of curved line segments of each subset of airway branches of the subsequent model.

2. The system according to claim 1, wherein the application, when executed, causes the computing device to apply, for each curved line segment, a linear interpolant connecting a first reference point along a respective curved line segment to a second reference point along the respective curved line segment.

3. The system according to claim 2, wherein the application, when executed, causes the computing device to determine the curvature of each curved line segment based on a respective linear interpolant.

4. The system according to claim 1, wherein the application, when executed, causes the computing device to compare, for each subset of airway branches of each generation, at least one curvature of each curved line segment of the initial model to at least one curvature of each curved line segment of the subsequent model.

5. The system according to claim 4, wherein matching of the plurality of curved line segments of each subset of airway branches of the initial model with the plurality of curved line segments of each subset of airway branches of the subsequent model is based on the comparison.

6. The system according to claim 1, wherein generating, for each airway branch of a respective subset of airway branches of each generation, a curved line segment is based on a connected sequence of line segments originating at a respective generation bifurcation and extending along a respective airway branch.

7. The system according to claim 1, wherein in matching the plurality of curved line segments of each subset of airway branches of the initial model with the plurality of curved line segments of each subset of airway branches of the subsequent model, the application when executed, further causes the computing device to:
  apply at least one of piecewise derivative overlapping filter, a curve similarity filter, a length similarity filter, or an angle similarity filter; and
  unmatch, based on the piecewise derivative overlapping filter, the curve similarity filter, the length similarity filter, or the angle similarity filters, portions of the initial model and of the subsequent model that were matched in the matching of the initial model with the subsequent model.

8. The system according to claim 1, wherein in matching the plurality of curved line segments of each subset of airway branches of the initial model with the plurality of curved line segments of each subset of airway branches of the subsequent model, the application when executed, further causes the computing device to:
  apply at least one of a local displacement consistency filter, a patch transformation consistency filter, or an isomorphism scoring system; and
  unmatch, based on the local displacement consistency filter, the patch transformation consistency filter, or the isomorphism scoring system, portions of the initial model and of the subsequent model that were matched in the matching of the initial model with the subsequent model.

9. The system according to claim 1, wherein the initial and subsequent images are CT images.

10. The system according to claim 1, wherein the application, when executed, causes the computing device to receive the initial images of the luminal network and the subsequent images of the luminal network.

11. The system according to claim 1, wherein in matching the initial model with the subsequent model, the application when executed, further causes the computing device to:
  select a plurality of initial reference points within the initial model; and
  select a plurality of subsequent reference points within the subsequent model,
  wherein the plurality of initial reference points and the plurality of subsequent reference points include x, y, and z coordinates.

12. The system according to claim 11, wherein the matching of the initial model with the subsequent model includes determining an alignment between the initial model and the subsequent model that minimizes a divergence between the plurality of initial reference points and the plurality of subsequent reference points.

13. The system according to claim 11, wherein the application, when executed, further cause the computing device to:
  select fiducial points within the plurality of initial reference points and fiducial points within the plurality of subsequent reference points;
  match the fiducial points within the plurality of subsequent reference points with the fiducial points within the plurality of initial reference points to generate a plurality of point pairs;
  generate a plurality of additional point pairs; and
  derive a thin plate splines transformation based on the plurality of point pairs and the plurality of additional point pairs.

14. A system for registering initial images of a luminal network with subsequent of the luminal network, the system comprising:
  a computing device including a processor and a memory; and
  an application, stored in the memory and executed by the processor, which when executed, causes the computing device to:
    generate an initial model of a luminal network based on initial images of the luminal network;
    generate a subsequent model of the luminal network based on subsequent images of the luminal network;
    match the initial model with the subsequent model;
    for each of the initial and subsequent models of the luminal network:
      deconstruct the luminal network into a plurality of generations, each generation of the plurality of generations originating at a generation bifurcation of the luminal network and having a subset of airway branches extending from the generation bifurcation;
      generate, for each airway branch of a respective subset of airway branches of each generation, a curved line segment; and
      determine a curvature of each curved line segment;
    compare, for each subset of airway branches of each generation, at least one curvature of each curved line segment of the initial model to at least one curvature of each curved line segment of the subsequent model; and
    unmatch portions of the initial model from portions of the subsequent model based on the comparison.

15. The system according to claim 14, wherein generating the curved line segment for each airway branch of a respective subset of airway branches of each generation is based on a connected sequence of line segments originating at a respective generation bifurcation and extending along a respective airway branch.

16. The system according to claim 14, wherein the application, when executed, causes the computing device to apply, for each curved line segment, a linear interpolant connecting a first reference point along a respective curved line segment to a second reference point along the respective curved line segment.

17. The system according to claim 16, wherein determining of the curvature of each curved line segment is based on a respective linear interpolant.

18. The system according to claim 14, wherein the application, when executed, causes the computing device to register the initial model with the subsequent model based on portions of the initial and subsequent models that remain matched after the unmatching.

19. The system according to claim 14, wherein the application, when executed, causes the computing device to receive the initial images of the luminal network and the subsequent images of the luminal network.

20. A system for registering initial images of a luminal network with subsequent images of the luminal network, the system comprising:
   a computing device including a processor and a memory; and
   an application, stored in the memory and executed by the processor, which when executed, causes the computing device to:
      receive initial images of the luminal network;
      receive subsequent images of the luminal network;
      for each of the initial and subsequent images of the luminal network:
         deconstruct the luminal network into a plurality of generations, each generation of the plurality of generations originating at a generation bifurcation of the luminal network and having a subset of airway branches extending from the generation bifurcation;
         generate, for each airway branch of a respective subset of airway branches of each generation, a curved line segment; and
         determine a curvature of each curved line segment; and
      match a plurality of curved line segments of each subset of airway branches of the initial images with a plurality of curved line segments of each subset of airway branches of the subsequent images.

* * * * *